US012748080B2

(12) United States Patent
Lee

(10) Patent No.: US 12,748,080 B2
(45) Date of Patent: Sep. 29, 2026

(54) PIPELINE MONITORING APPARATUS AND METHOD OF USE THEREOF

(71) Applicant: W Davis Lee, Rockport, ME (US)

(72) Inventor: W Davis Lee, Rockport, ME (US)

( * ) Notice: Subject to any disclaimer, the term of this patent is extended or adjusted under 35 U.S.C. 154(b) by 290 days.

(21) Appl. No.: 18/376,616

(22) Filed: Oct. 4, 2023

(65) Prior Publication Data

US 2024/0329006 A1 Oct. 3, 2024

Related U.S. Application Data

(60) Provisional application No. 63/455,764, filed on Mar. 30, 2023.

(51) Int. Cl.

| | |
|---|---|
| ***G01N 29/24*** | (2006.01) |
| ***G01N 29/07*** | (2006.01) |
| ***G01N 29/22*** | (2006.01) |
| ***G01N 29/265*** | (2006.01) |

(52) U.S. Cl.

CPC ....... *G01N 29/2481* (2013.01); *G01N 29/223* (2013.01); *G01N 29/225* (2013.01); *G01N 29/2437* (2013.01); *G01N 29/265* (2013.01); *G01N 29/07* (2013.01); *G01N 2291/02854* (2013.01); *G01N 2291/0289* (2013.01); *G01N 2291/106* (2013.01); *G01N 2291/2634* (2013.01)

(58) Field of Classification Search

CPC ............. G01N 29/2481; G01N 29/223; G01N 29/225; G01N 29/2437; G01N 29/265; G01N 29/07; G01N 29/4481; G01N 2291/02854; G01N 2291/106; G01N 2291/2634; G01N 2291/0289

USPC .......................................................... 73/592

See application file for complete search history.

(56) References Cited

U.S. PATENT DOCUMENTS

| | | | | |
|---|---|---|---|---|
| 6,848,313 | B2 * | 2/2005 | Krieg ................. | G01N 29/2456 73/624 |
| 7,673,525 | B2 * | 3/2010 | Huang .................... | G01F 1/667 73/861.25 |
| 7,830,273 | B2 * | 11/2010 | Twitchell, Jr. ........ | H04L 67/125 340/870.07 |
| 8,665,101 | B2 * | 3/2014 | Solomon ................... | G01F 1/66 73/152.58 |
| 9,766,151 | B2 * | 9/2017 | Hoshuyama et al. .. | G01M 3/00 |
| 2016/0116440 | A1 * | 4/2016 | Luo ........................ | G01N 29/07 73/592 |
| 2020/0132449 | A1 * | 4/2020 | Giese ................. | G01N 29/4427 |
| 2022/0205956 | A1 * | 6/2022 | Stephens et al. ...... | G01N 29/12 |

FOREIGN PATENT DOCUMENTS

| | | | | |
|---|---|---|---|---|
| EP | 3480591 A1 | * 5/2019 | ............. | G01N 29/28 |
| GB | 2502440 A | * 11/2013 | ............. | G01N 29/28 |
| GB | 2508515 A | * 6/2014 | ........... | G01N 29/223 |

* cited by examiner

*Primary Examiner* — John E Breene

(74) *Attorney, Agent, or Firm* — Kevin H. Hazen; Hazen Patent Group, LLC

(57) ABSTRACT

The invention comprises an apparatus and method of use thereof for measuring state of a pipeline grid using sets of sensor arrays mounted to sections of the pipeline. Data from the sensors is collected and used to determine state of the pipeline grid as a function of time and/or location.

14 Claims, 24 Drawing Sheets

PIPELINE MONITORING APPARATUS AND METHOD OF USE THEREOF

CROSS-REFERENCES TO RELATED APPLICATIONS

This application claims benefit of U.S. provisional patent application No. 63/455,764 filed Mar. 30, 2023, all of which is incorporated herein in its entirety by this reference thereto.

BACKGROUND OF THE INVENTION

Field of the Invention

The invention relates generally to monitoring pipelines.

DISCUSSION OF THE PRIOR ART

Problem

There exists in the art a need for a monitoring pipelines.

SUMMARY OF THE INVENTION

The invention comprises a pipeline monitoring apparatus and method of use thereof.

DESCRIPTION OF THE FIGURES

A more complete understanding of the present invention is derived by referring to the detailed description and claims when considered in connection with the Figures, wherein like reference numbers refer to similar items throughout the Figures.

Elements and steps in the figures are illustrated for simplicity and clarity and have not necessarily been rendered according to any particular sequence. For example, steps that are performed concurrently or in different order are illustrated in the figures to help improve understanding of embodiments of the present invention.

DETAILED DESCRIPTION OF THE INVENTION

The invention comprises an apparatus and method of use thereof for measuring state of a pipeline grid using sets of sensor arrays mounted to sections of the pipeline. Data from the sensors is collected and used to determine state of the pipeline grid as a function of time and/or location.

Herein, a z-axis is aligned with gravity and an x/y-plane is perpendicular to the z-axis, such as flat ground.

Monitoring System

Generally a monitoring system monitors one or more set of sensor arrays to determine the state of a system and/or a state of a system sub-system or component.

Figure 1:
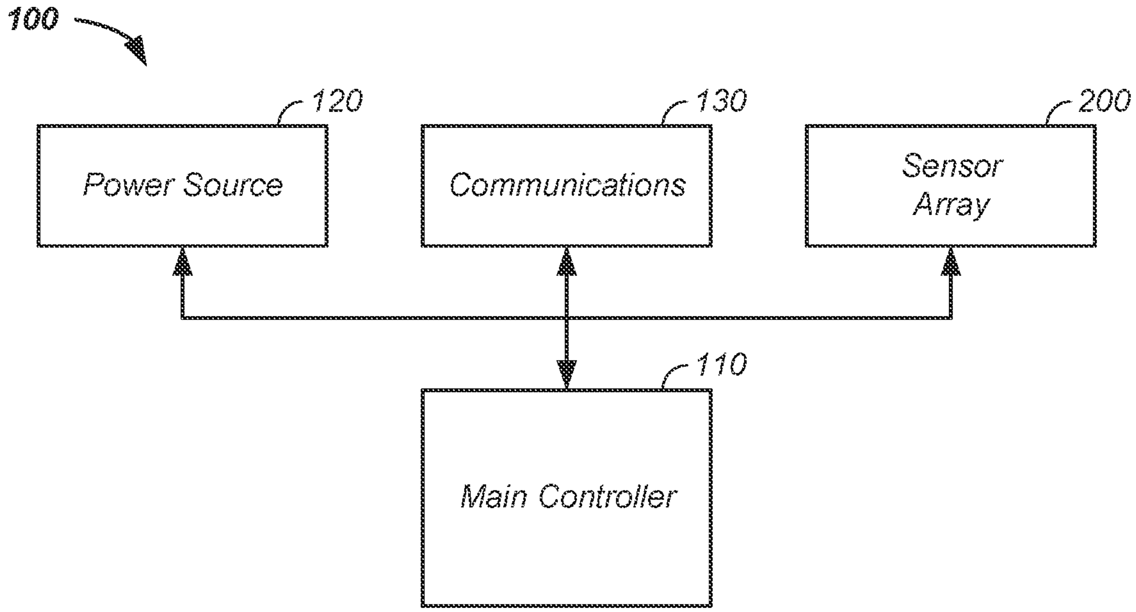
FIG. 1 illustrates a control system using a sensor array.

Referring now to FIG. 1, a first example of a monitoring system 100 is illustrated. Generally, a main controller 110 is powered with one or more power sources 120 and communicates using a communication system 130 with one or more sensors in one or more sensor arrays 200. The power sources 120 are optionally used to power the communication 130 and/or the sensor array 200. The communications 130 are optionally linked to the power sources 120 and/or the sensor arrays 200.

For clarity of presentation and without loss of generality, the monitoring system 100 is described using a pipeline monitoring example. More generally, the monitoring system 100 is used to monitor any two or more arrays of sensors connected to an extended system, such as piers in a wharf, power lines, or oil rigs.

Figure 2:
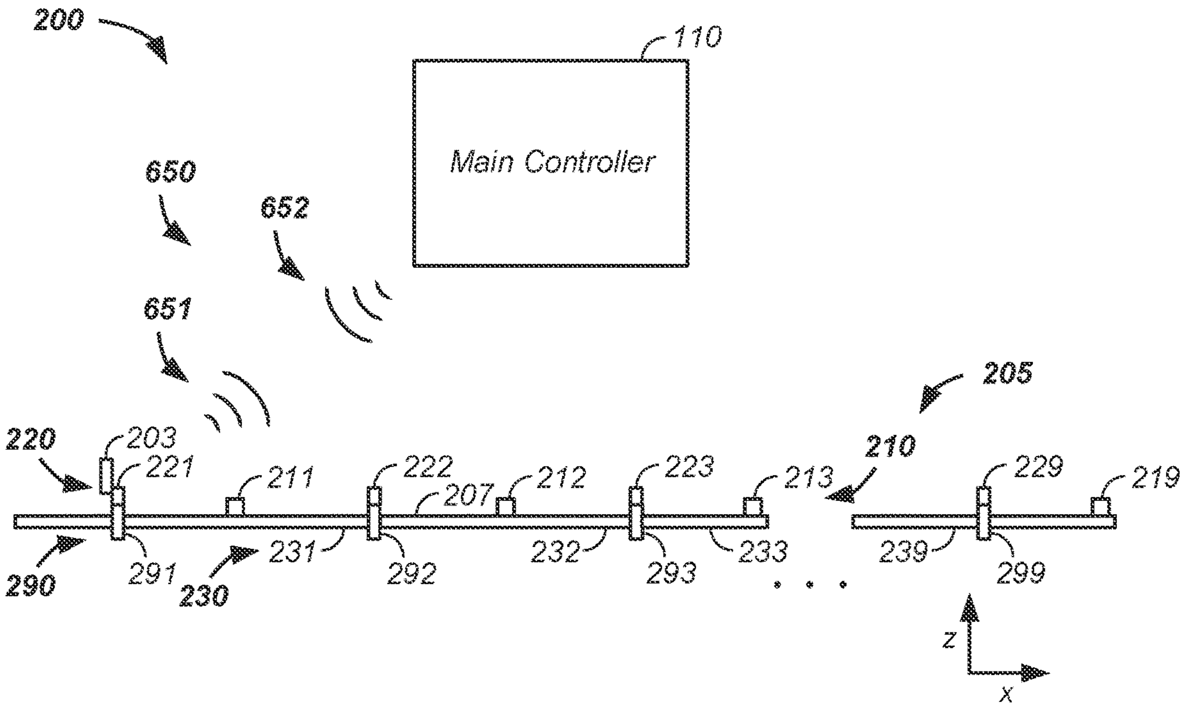
FIG. 2 illustrates a pipeline monitoring sensor array and controller.

Referring now to FIG. 2, a pipeline monitoring system 200 is illustrated. In the pipeline monitoring system 200, the main controller 110 is linked to one or more pipelines 205. As illustrated, the pipelines 205 includes a set of connectors 290/junctions, such as a first connector 291, a second connector 292, a third connector 293, . . . , and an $n^{th}$ connector 299 connecting a set of pipeline sections 230, such as a first pipeline section 231, a second pipeline section 232, a third pipeline section 233, . . . , and an $n^{th}$ pipeline section 239, where n is a positive integer, such as greater than 10, 100, 1,000, or 10,000. Optionally and preferably, the sensor array 120 includes a first set of sensors 210 and a second set of sensors 220, described infra.

Still referring to FIG. 2, the first set of sensors 210 are optionally and preferably attached to an individual pipeline 207. The first set of sensors 210 or pipeline sensors includes a first pipeline sensor 211, a second pipeline sensor 212, a third pipeline sensor 213, . . . , and an $n^{th}$ pipeline sensor 219, where n is a positive integer, such as greater than 10, 100, 1,000, or 10,000. Sensors in the first set of sensors 210 are designed to measure condition of the individual pipeline 207 at known locations, such as measured by GPS or placed at specific known locations during installation, such as between each pipeline connector, between every other pipeline connector, and/or at known distances along the pipeline 205, such as at every 0.1, 0.2, 0.5, 1, 2, 5, or 10 miles or with separation distance exceeding and/or less than 0.1, 0.2, 0.5, 1, 2, 5, or 10 miles. Optionally and preferably, members of the pipeline sensors are placed at positions along the pipeline between successive connectors, greater than 5, 10, 15, 20, 25, 50, or 100 feet from a pipeline connector.

Still referring to FIG. 2, members the second set of sensors 220 are optionally and preferably attached to corresponding individual pipeline connectors of the set of connectors 290. The second set of sensors 220 or pipeline positioned sensors includes a first connector positioned sensor 221, a second connector positioned sensor 222, a third connector positioned sensor 223, . . . , and an $n^{th}$ connector positioned sensor 229, where n is a positive integer, such as greater than 10, 100, 1,000, or 10,000. Sensors in the second set of sensors 220 are designed to measure condition of the individual pipeline 207 at known locations, such as measured by GPS or placed at specific known locations during installation, such as at each pipeline connector, at every other pipeline connector, and/or at known distances along the pipeline 205, such as at every 0.1, 0.2, 0.5, 1, 2, 5, or 10 miles or with separation distance exceeding and/or less than 0.1, 0.2, 0.5, 1, 2, 5, or 10 miles. Optionally and preferably, members of the pipeline connector positioned sensors are placed at positions relative to each connector, such as at the top of the connector, at the bottom of the connector, within 5, 10, 15, 25, 50, 100, or 200 feet of the connector, and/or within 1, 2, 5, 10, 15, 25, or 50 feet of the top of the pole or the bottom of the connector.

Still referring to FIG. 2, at least some elements of the first set of sensors 210, the pipeline sensors, measure fluid flow, build-up, corrosion, and/or electrical resistance. For instance, one or more sensors of the first set of sensors 210 include a first cluster of sensors, further described infra. A first cluster of sensors includes one or more sensors. In this case, the one or more sensors and/or the first cluster of sensors of the first set of sensors 210 includes one of more of: an ultrasonic sensor to measure localized corrosion of the pipeline, flow of fluid in the pipeline, and/or build-up of material/sludge in the pipeline; a temperature monitor; a power supply, such as from the power sources 120; and/or a parasitic power source inductively coupled to the pipeline, such as the individual pipeline 207.

Still referring to FIG. 2, at least some elements of the second set of sensors 220, the pipeline connector positioned sensors, measure local conditions, such as weather, localized flow through the line, state of the pipeline section, and/or state of the pipeline. For instance, one or more sensors of the second set of sensors 210 include a second cluster of sensors, further described infra. A second cluster of sensors includes one or more sensors. In this case, the one or more sensors and/or the second cluster of sensors of the second set of sensors 210 includes one of more of: a camera to monitor the pipeline, an accelerometer to measure localized movement of the pipeline at the known location, a temperature monitor, a weather station containing one or more weather monitoring sensors, a power supply, such as from the power sources 120, and/or a parasitic power source. The second set of sensors 210 are optionally and preferably used to measure weather induced changes to the pipeline, such as the individual pipeline 207, at or about the known position of the local pipeline section.

Still referring to FIG. 2, any element of the first set of sensors 210 is optionally present in any of the second set of sensors 220 and vise-versa.

Still referring to FIG. 2, a transmitter and/or a receiver is optionally and preferably present with each installation of the first set of sensors 210 and/or the second set of sensors 220. Thus, the sensors optionally and preferably communicate, such as sending data collected from the sensors and/or information derived therefrom to the main controlled through the communications 130. As illustrated, the signals are sent along the line and/or optionally and preferably wirelessly, such as in a wireless communication system 650 with signals sent from the pipeline 651 directly and/or indirectly to the main controller 110 and/or transmitted 652 from the main controller 110 to the pipeline. Signals are optionally sent parallel to the line and/or between pipelines as further described infra. Optionally, one or more sub-communication systems 203 gather information from various sensors along the pipeline before transmitting to a local tower and/or to the main controller, as further described infra.

Figure 3:
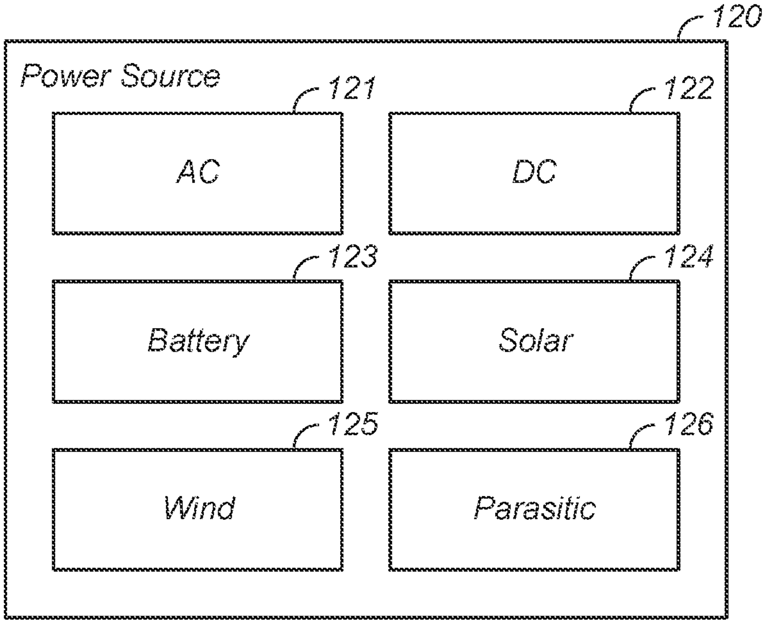
FIG. 3 illustrates power sources.

Referring now to FIG. 3, the power source 120 is further described. Optionally, the power source, linked to one or more of the individual sensors, cluster of sensors, the communications 130, and/or the sensor arrays 200, includes one or more of: AC power 121, DC power 122, a converter, and inverter, a battery 123, solar power 124, wind derived power 125, and/or parasitic power 126.

Figure 4:
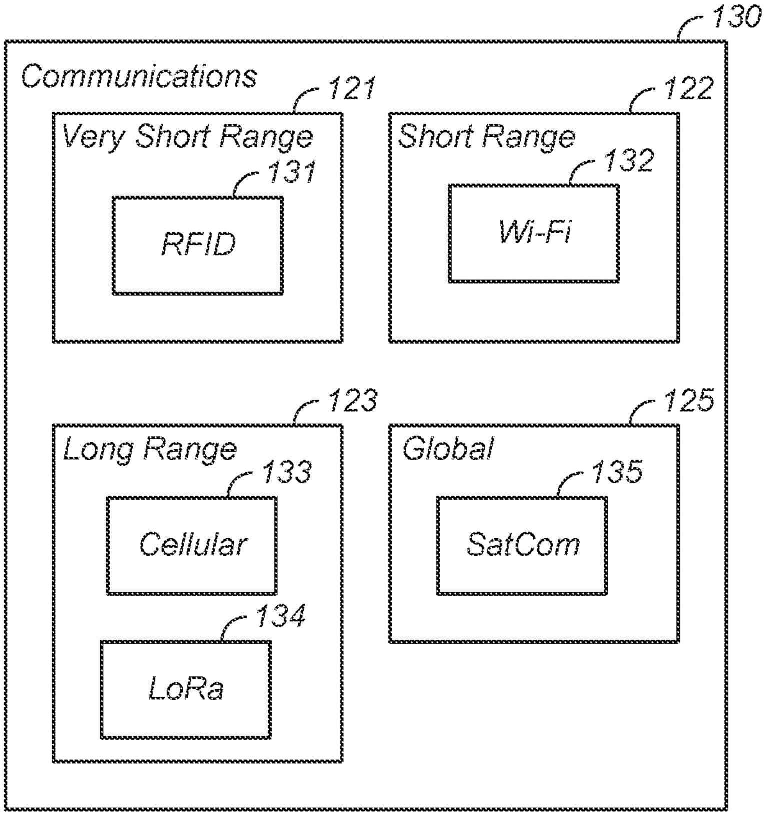
FIG. 4 illustrates communication systems.

Referring now to FIG. 4, the communications 130 also referred to as a communications system is further described. The communications 130 are optionally linked to any one or more element of the monitoring system 100, such as to individual sensors of the sensor arrays 200, the sensor arrays 200, any one or more connectors/mounts/poles of the pipeline, any intermediate tower, and/or any intermediate communication network connected directly and/or indirectly to the main controller 110. The communications 130 optionally and preferably include one or more of: very short range communications 121, such as radio-frequency identification (RFID) communications 131; short range communications 122, such as Wi-Fi 132 or Bluetooth; long range communications 123, such as cellular 123 or long range radio (LoRa) 134; and/or global communications 124, such as satellite communications (SatCom) 135.

Sensor Array

Figure 5A:
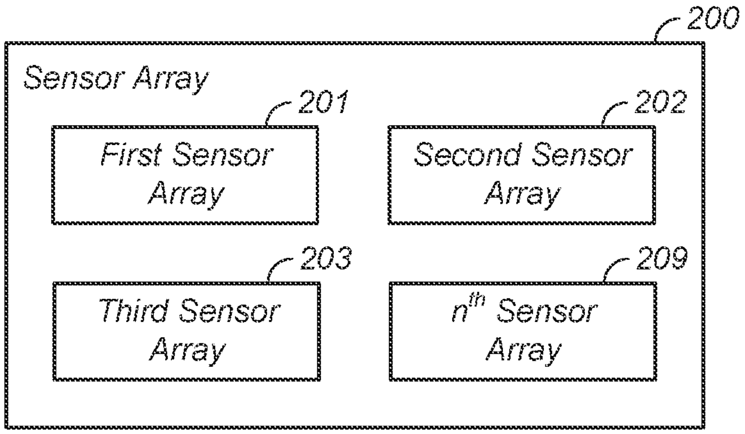
FIG. 5A illustrates multiple sensor arrays.
Figure 5B:
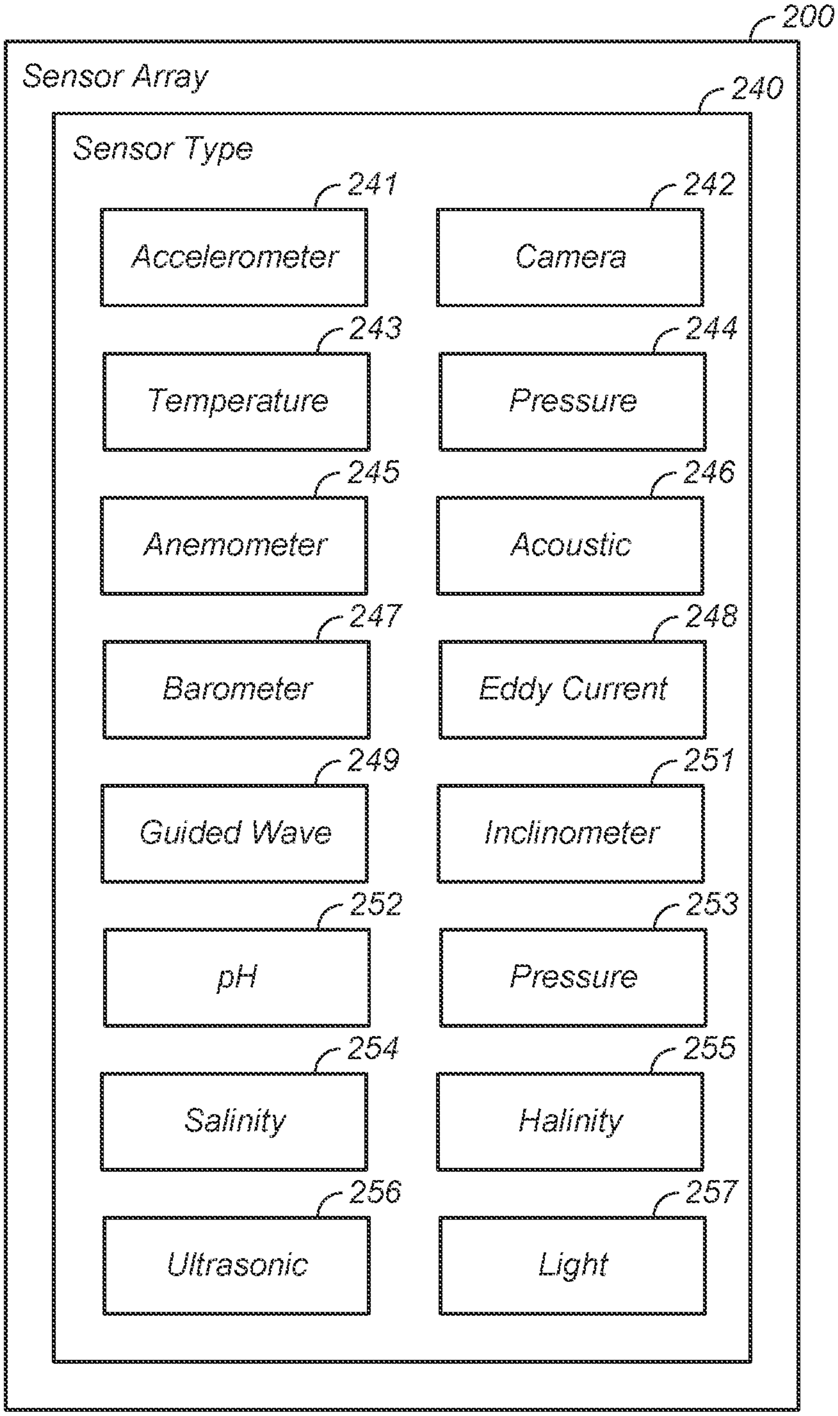
FIG. 5B illustrates sensor types.
Figure 5C:
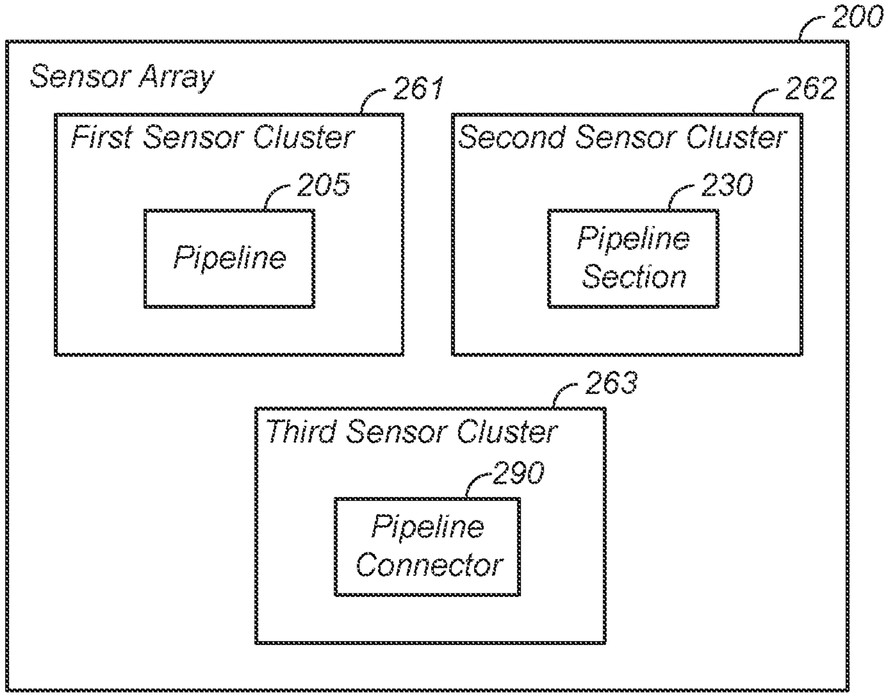
FIG. 5C illustrates sensor clusters.

Referring now to FIG. 5A, FIG. 5B, and FIG. 5C, the sensor array 200 is further described.

Referring now to FIG. 5A, the sensor array 200 preferably includes 2, 3, 4, or more individual sensor arrays or clusters of sensors, such as the first set of sensors 210, such as connector positioned sensors, and the second set of sensors 220, such as pipeline section positioned sensors, described supra. For instance, the sensor array 200 optionally includes one or more of a first sensor array 201, a second sensor array 202, a third sensor array 203, . . . , and an $n^{th}$ sensor array 209, where n is a positive integer greater than 1, 2, 3, 4, 5, 10, 15.

Referring now to FIG. 5B, the sensor array 200 optionally and preferably includes one or more sensor types 240, such as one or more of: an accelerometer 241, a camera 242, a temperature sensor 243, a pressure sensor 244, an anemometer 245, an acoustic sensor 246, a barometer 247, and eddy current sensor 248, a guided wave sensor 249, an inclinometer 251, a pH sensor 252, a pressure sensor 253, a salinity sensor 254, a halinity sensor 255, an ultrasonic sensor 256, and/or a light sensor 257.

Referring now to FIG. 5C, the sensor array 200 optionally and preferably includes an array of sensor clusters. Any 2, 3, 4, or more sensors positioned together in a container is referred to as a sensor cluster herein. For instance, when two or more sensors are co-positioned as a member of the first set of sensors 210 or pipeline sensors, the co-positioned sensors are an example of a first sensor cluster 261 mounted to a specific pipeline section 205. Similarly, when two or more sensors are co-positioned as a member of the second set of sensors 220, the co-positioned sensors are an example of a second sensor cluster 262 mounted to an individual pipeline/pipeline section 230. An example of a third sensor cluster 263 is a weather station 273, which includes any two or more of the sensor types 240 when used to measure weather and/or the impact of weather/earth movement on the pipelines and/or sensors connected to pipeline connectors 290.

Communications

Figure 6:
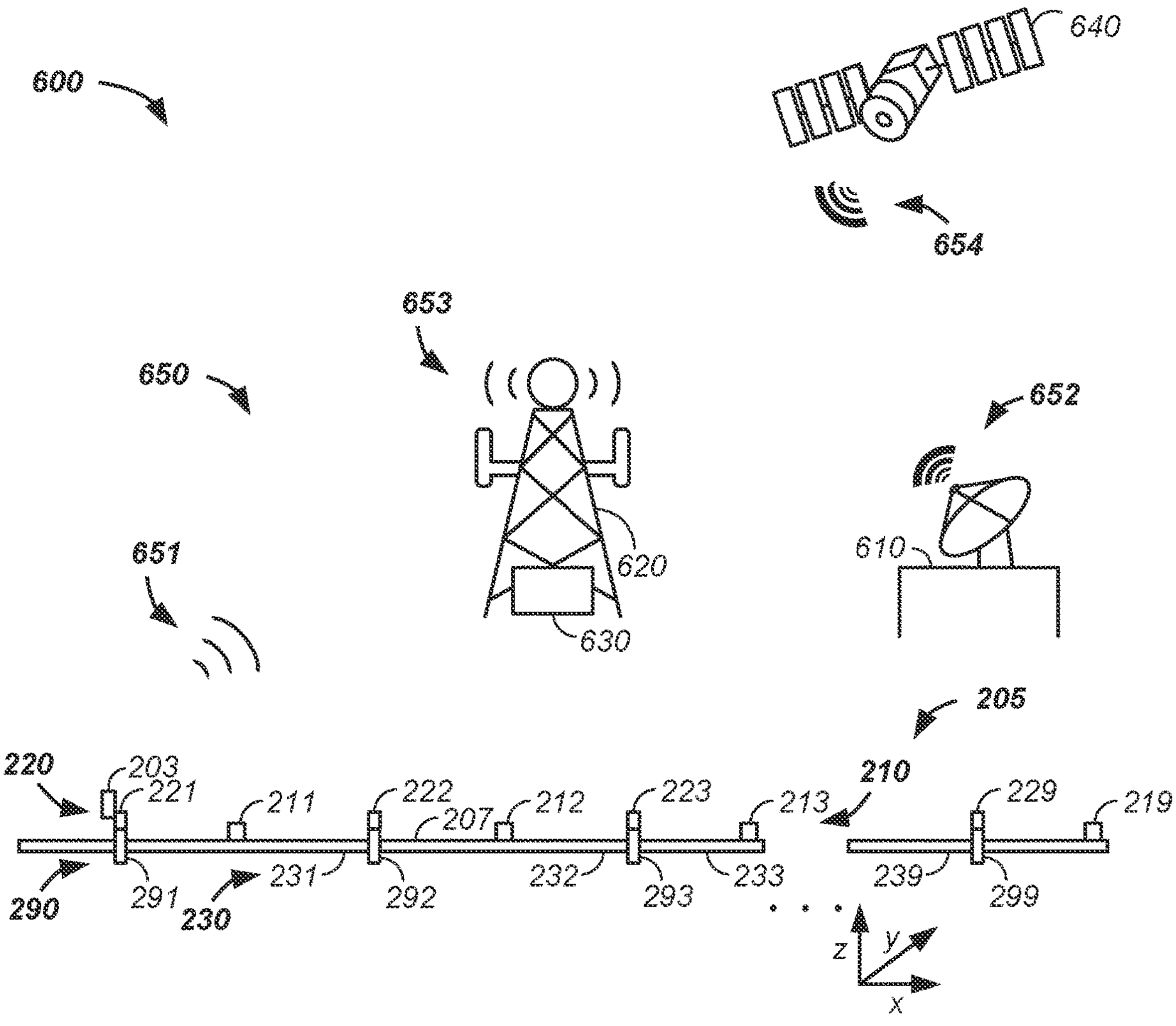
FIG. 6 illustrates communication linkages.

Referring now to FIG. 6, the communications 130 are further described. Here, the wireless communication system 650 is further described. The wireless communication system 650 optionally includes a base station 610, such as housing a version of the main controller 110 or the main controller 110, the main controller 110 is optionally located anywhere, such as in/on a tower 620, such as housing a data collector/transceiver 630 communicatively linked with the main controller 110 and the sub-communication systems 203 sending receiving first optional communications 652. A satellite 640 is optionally used to relay second optional communications 653 as part of a communication line from sensors of the monitoring system to the main controller 110.

Figure 7:
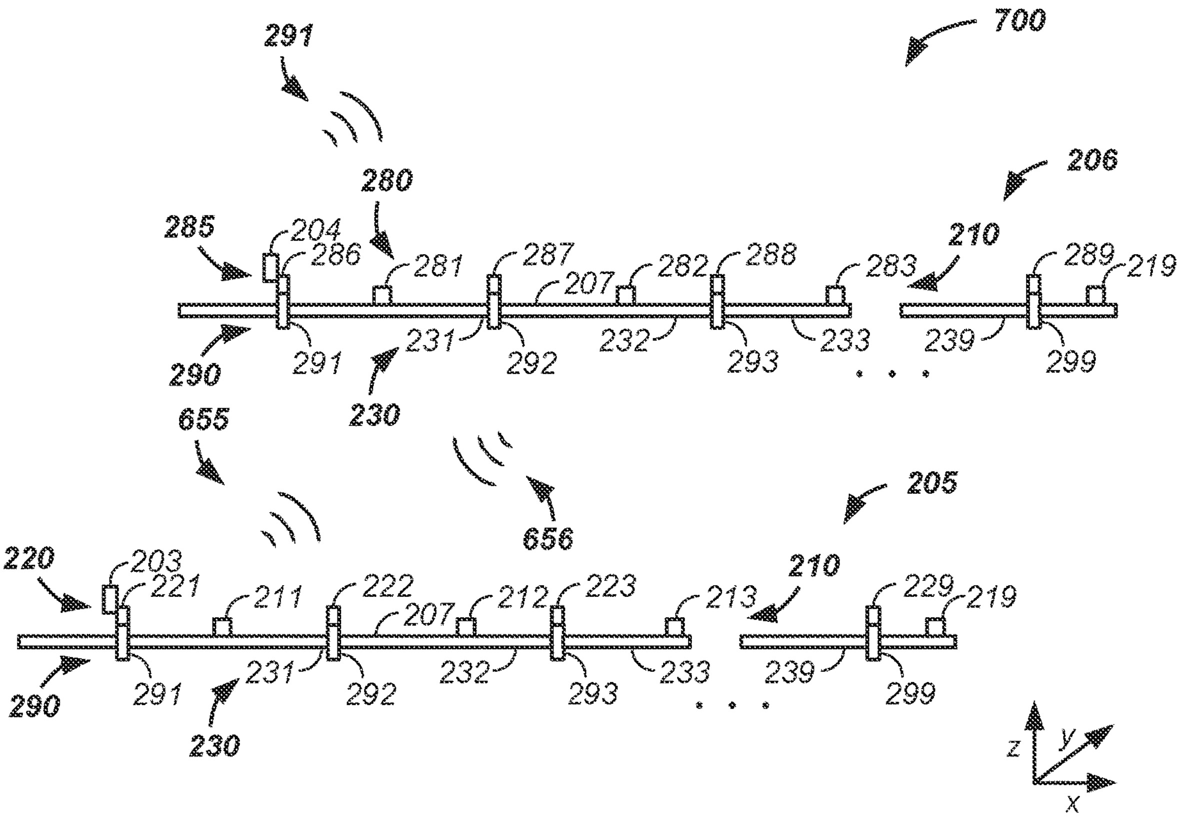
FIG. 7 illustrates multiple sensor lines monitoring an area.

Referring now to FIG. 7, monitoring areas, as opposed to individual pipelines, and communications between lines is described. As illustrated, the first and second sensor arrays 210, 220 on the individual pipeline are optionally repeated on any number of pipelines, which brings a benefit of adding information about a pipeline grid or area covered by the pipelines. For example, a third set of sensors 280 and a fourth set of sensors 285 are illustrated on a second pipeline 206. The third set of sensors 280 includes any of the sensors of the first set of sensors 210, such as in a first cluster 281, a second cluster 282, a third cluster 283, . . . , and an $n^{th}$ cluster 284 on a second pipeline 206, where n is a positive integer greater than 2, 5, 10, 100, 1000, or 10,000. Each cluster has any number of sensors, such as from the sensor types 240. Similarly, the fourth set of sensors 285 includes any of the sensors of the second set of sensors 210, such as in a sixth cluster 286, a seventh cluster 287, an eighth cluster 28, and/or an ninth cluster 289 on the second pipeline 206, where each set of sensors optionally has any number/type of sensors, such as from the sensor types 240, at n locations where n is a positive integer greater than 2, 5, 10, 100, 1000, or 10,000. As illustrated, the communications 130 optionally and preferably contain communications between any element of the individual pipeline 205 and the second pipeline 206, such as via fifth and sixth transmitter and/or receivers 655, 656. By extension, the communications 130 optionally extended between any number of pipelines to cover a pipeline grid or area.

Figure 8A:
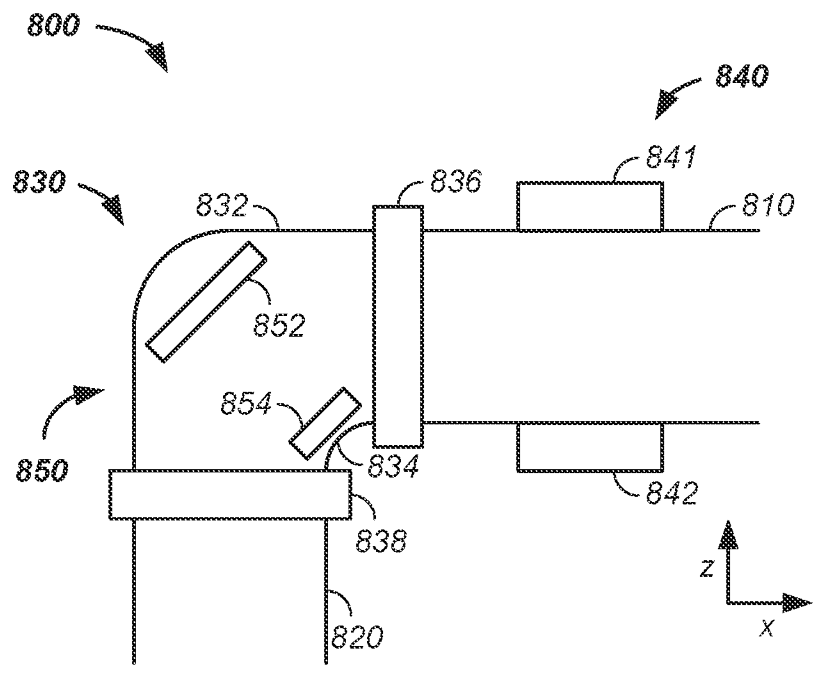
FIG. 8A illustrates pipeline joints and FIG. 8B illustrates pipeline sensors.
Figure 8B:
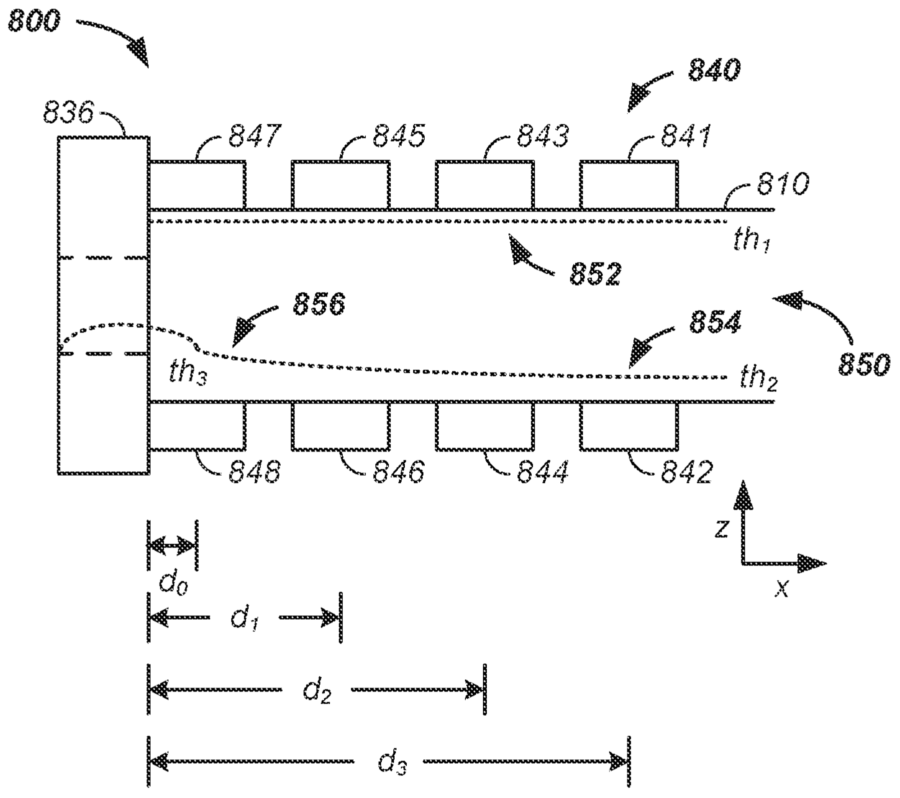

Referring now to FIG. 8A and FIG. 8B, sensors and/or differential sensors 800 about a pipe are illustrated. Referring now to FIG. 8A, a first pipeline tube section 810 and a second pipeline tube section 820 are joined with a pipeline turning section 830. As illustrated, the pipeline turning section 830 has an outer turn edge 832, an inner turn edge 834, a first coupler 836, and a second coupler 838. In use, the first coupler 836 couples to the first pipeline tube section 810 and the second coupler 838 couples to the second pipeline tube section 820, thus joining the first and second pipeline tube sections 810, 820.

Still referring to FIG. 8A, a first set of sensors 840, such as a first set of ultrasonic sensors, are positioned on a pipeline tube, such as on opposite sides of the first pipeline tube section 810. For instance, a first ultrasonic sensor 841 is positioned on a top of the tube section or within less than 15, 30, 45, 60, 75, 90, 105, or 120 degrees from the top of the tube, along an angle about a central point in the tube. Similarly, a second ultrasonic sensor 842 is positioned on a bottom of the tube section, such as within less than 15, 30, 45, 60, 75, 90, or 105 degrees from the bottom of the tube, about the central point in the tube. Generally, the ultrasonic sensors are each and/or are jointly capable of measuring wall thickness of the pipeline, sludge build-up in the pipeline, and/or presence/type of fluid in the pipeline, as further described infra. Optionally, differential measurements are made using readings from the first and second pipeline tube sections 810, 820. For instance, the top wall is likely to have less sludge than the bottom wall, so a differential signal provides sludge information. Similarly, a differential measurement is optionally used to measure wall thickness, with a loss of wall thickness due to corrosion of the pipe wall. A ultrasonic reference signal of a new pipe is optionally used.

Still referring to FIG. 8A, a second set of sensors 850, such as a second set of ultrasonic sensors, are illustrated. As illustrated, a ninth ultrasonic sensor 852 is positioned within 1, 2, 5, 10, 20, 50, 100, 250, or 500 mm from the outer turn edge 832 and/or a tenth ultrasonic sensor 854 is positioned within 1, 2, 5, 10, 20, 50, 100, 250, or 500 mm from the inner turn edge 834. Again, differential signals and/or any comparison of signals from two ultrasonic sensors are optionally used in analysis, such as from the ninth ultrasonic sensor 852 and the tenth ultrasonic sensor 854.

Referring now to FIG. 8B, the first set of sensors 840 is optionally a sensor array. As illustrated, the array includes a first ultrasonic sensor 841, a second ultrasonic sensor 842, a third ultrasonic sensor 843, a fourth ultrasonic sensor 844, a fifth ultrasonic sensor 845, a sixth ultrasonic sensor 846, a seventh ultrasonic sensor 847, and an eighth ultrasonic sensor 848, of n ultrasonic sensors where n is a positive integer greater than 0, 1, 2, 4, 6, 8, 10, 15, or 20. Optionally and preferably, the first set of sensors 840 are positioned along a length of a give pipe section, such as at different distances, such as at four progressively larger distances $d_0$, $d_1$, $d_2$, and $d_3$, from a coupler, such as the first coupler 836, which allows an array analysis of the pipe section, such as measuring gunk build-up in the pipe section proximate the coupler, fluid flow through the pipe, and/or corrosion of the pipe.

Force Sensors

Generally, a force sensor generates a force wave that is sent along the pipeline to another sensor and/or back to the original force wave generation sensor. Generally, any sensor or set of sensors that uses a propagating force wave along a section or piece of pipeline falls into the category of a force sensor. For clarity of presentation and without loss of two force sensors are described herein, an ultrasonic sensor and a magnetostriction sensor.

Ultrasonic Transducer/Sensor

Generally, The ultrasonic sensor 256 is optionally an ultrasonic transducer 900 and/or a piezoelectric transducer, which is able to convert an electrical signal into mechanical vibrations and/or mechanical vibrations into an electrical signal. An ultrasonic transducer 900 is optionally viewed as a thickness gauge that measures precisely how long it takes for a sound wave caused by the ultrasonic sensor 256 to travel through a material to a sensor or to reflect off of a barrier in the material and travel back to the ultrasonic sensor 256. For clarity of presentation and without loss of generality, an example of the ultrasonic transducer 900 is provided, infra.

Example I

Figure 9:
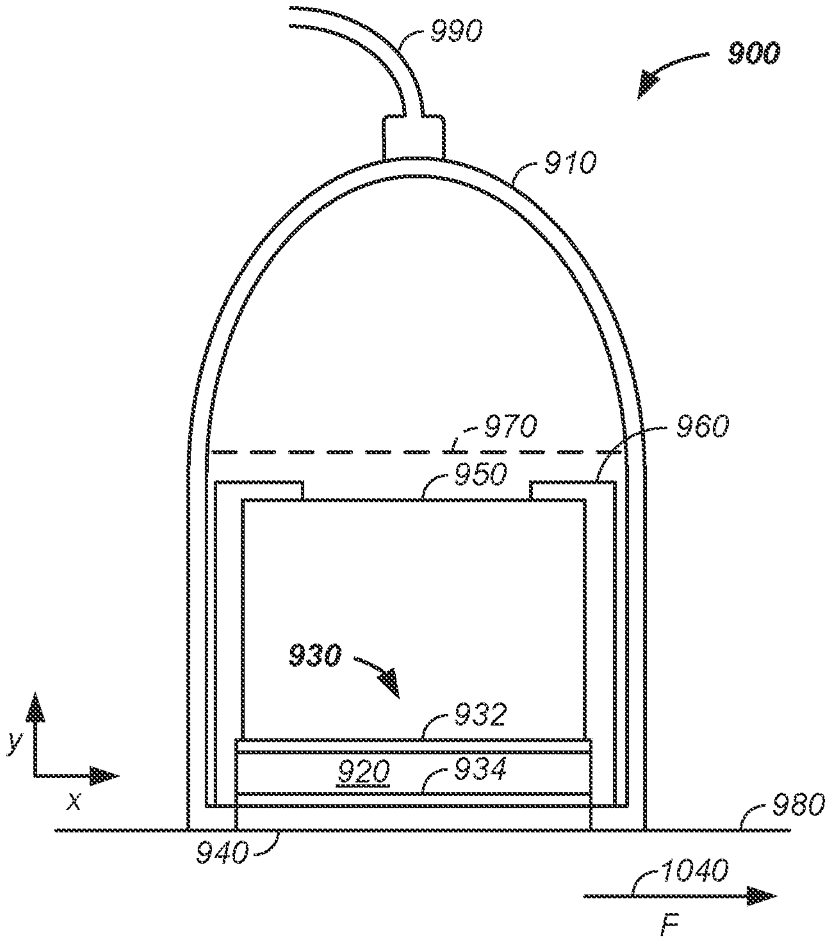
FIG. 9 illustrates an ultrasonic transducer.

Referring now to FIG. 9, an example of an ultrasonic transducer 900 is illustrated. As illustrated, the ultrasonic transducer 900 includes a housing 910, which houses a piezoelectric element 920 between a pair of electrodes 930, such as a positive electrode 932 and a ground electrode 934. A voltage, such as via a transducer lead 990, sent to the piezoelectric element deforms and/or changes the shape of the piezoelectric element and the resulting force is sent into the pipe, such as through an optional coupling element 940 and/or coupling fluid. An optional damping block 950 aids directing the force changes into the pipe 980, while an optional acoustic insulator 960 and/or metal shield 970 protect a user and/or reduce environmental effects, such as sound and RF fields respectively. The force sent into the pipe 980 propagates through/along the pipe, such as via a force wave 1040 sent along the pipe. Herein, the pipe 980 is any section of the pipelines 205. Optionally, the ultrasonic transducer 900 functions as a transmitter and a second ultrasonic transducer functions as a receiver and/or the ultrasonic transducer 900 functions as a transmitter at a first moment in time and then as a receiver, such as when the force wave 1040 reflects off of a surface and/or joint at second moment in time.

Magnetostriction Sensor

Generally, The ultrasonic sensor 256 (FIG. 5B) is optionally a magnetostriction sensor 1000. A magnetostriction sensor uses magnetostriction/electrostriction where magnetostriction is a property of magnetic materials that causes them to change their shape or dimensions during the process of magnetization. Hence, magnetostriction materials can convert magnetic energy into kinetic energy, or the reverse, and are used to build actuators and sensors. For instance, an electric/magnetic signal is converted into mechanical vibrations and/or mechanical vibrations into an electrical signal. For clarity of presentation and without loss of generality, an example of a magnetostriction sensor 1000 is provided, infra.

Example I

Figure 10:
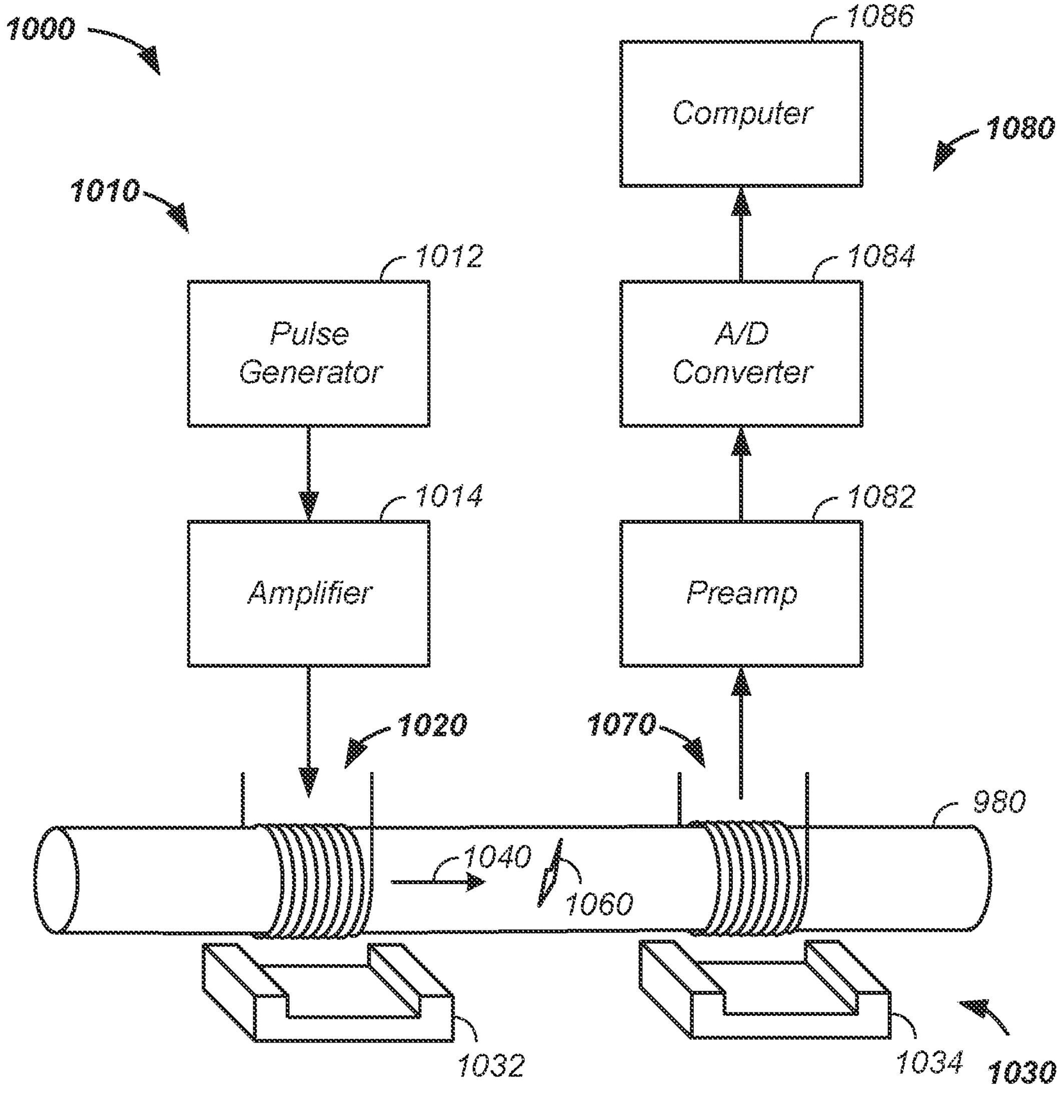
FIG. 10 illustrates a magnetostriction sensor.

Referring now to FIG. 10, for clarity of presentation and without loss of generality, an example of a magnetostriction sensor 1000 is provided. Generally, an input signal 1010, such as a voltage, is provided, such as via a pulse generator 1012 and amplifier 1014, to a transmitting coil 1020, which constricts a section of the pipe 980 and generates a force wave 1040, which propagates through, along, and/or around a section of the pipe 980. The force wave 1040, also referred to as a mechanical wave, interacts with the pipe 980 and any imperfection, such as a crack 1060, joint, build-up, corrosion, and/or content, as further described infra. The interaction alters the force wave 1040 resulting in an altered force wave, which is detected at a receiving coil 1070. The transmitting coil 1020 and receiving coil 1070 are optionally magnetoelectrically biased with bias magnets, 1030, such as a first bias magnet 1032 and a second bias magnet 1034. The receiving coil 1070 detects the force wave 1040 with a detection system 1080, such as using a preamp 1082, A/D converter 1084, and/or computer 1086. For instance, a short-duration pulse is sent to the transmitting coil. The transmitting coil applies a time-varying magnetic field to the pipe, which yields mechanical waves that propagates along the length of the pipe. When the mechanical wave passes by the receiving coil, the magnetic induction at the receiving coil changes and an electric voltage is generated, which is detected, amplified, and/or digitized, where the digitized signal includes absorbances or changes in the force wave 1040 indicative of the crack 1060, joint, build-up, corrosion, and/or content of the pipe. Generally, the pipe being tested is optionally and preferably in a magnetized state. A crack in the pipe changes alters propagation of the mechanical wave, which results in a change in signal that is detected. Generally, the altered force wave 1040 is a signal that represents the state of the pipe 980, such as cracks, joints, build-up, and/or corrosion as a function of time and location as further described infra. Optionally, the transmitting coil 1020 functions as the receiving coil 1070, such as when the force wave 1040 reflects off of a surface and/or joint.

For clarity of presentation, operation of the ultrasonic transducer is used to illustrate propagation and detection of the force wave. However, the inventor notes that the ultrasonic transducer is representative of any force sensor, such as the magnetostriction sensor 1000. Multiple examples of paths of the force wave 1040 and signals generated therefrom are provided, infra. Any element of the magnetostriction sensor 1000 is optionally used as an element of the ultrasonic transducer 900 and vice-versa.

Example I

Figure 11A:
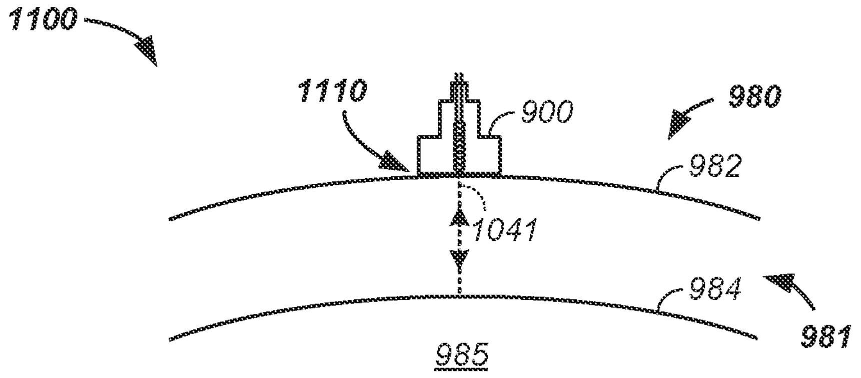
FIG. 11A illustrates monitoring a pipe wall thickness and FIG. 11B illustrates reflective readings of a pipe wall.
Figure 11B:
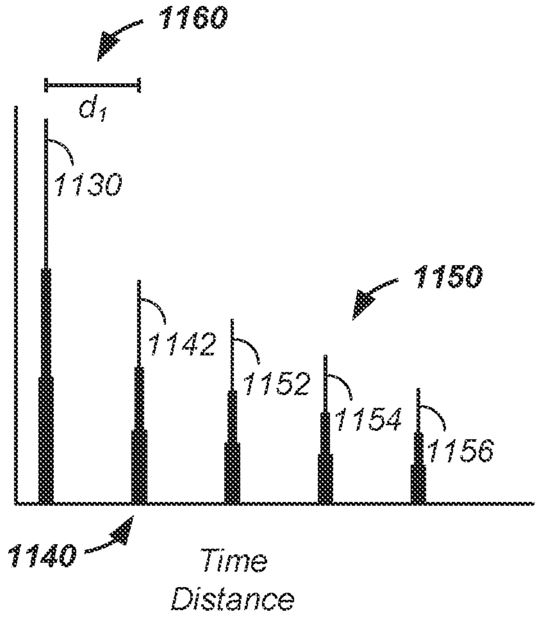

Referring now to FIG. 11A, an example of the ultrasonic transducer 900 is further described in terms of interaction 1100 with an incident wall 980 of a pipe 980/tube. More particularly, a single pulse is illustrated from the ultrasonic transducer 900, though in practice multiple pulses are sent into the pipe 980, such as at ultrasonic frequencies. As illustrated, an ultrasonic pulse or transmitter pulse 1130, generated by the ultrasonic transducer 900, generates the force wave 1040, where the pulse is optionally coupled to the pipe 980 with a coupling fluid 1110. A first path 1041 of the pulse passes through a first outer surface 982 of the incident wall 981 and at least partially reflects off of a first inner surface 984 of the incident wall 981, such as prior to entering a fluid area 985 within the pipe 980. Referring now to FIG. 11B, the transmitter pulse 1130 is illustrated at a first time and successive reflections 1150 are illustrated. Particularly, a first reflection 1142, at a first time 1140, $t_1$, is representative of a wall thickness, $d_1$, of the pipe 980. Successive reflections 1150, such as a second reflection 1152, a third reflection 1154, and a fourth reflection 1156 are additional measures of the wall thickness, $d_1$. The successive reflections 1150 progressively decrease in magnitude of response and increase in width. The successive reflections 1150 are illustrated here to describe one element of detected signals, where analysis of the detected signal yields information on the state of the pipe 980, such as cracks, corrosion, pits, and build-up. For clarity of presentation, successive reflections are not illustrated in subsequent examples, where additional behavior of the force wave 1040 is illustrated.

Example II

Figure 12:
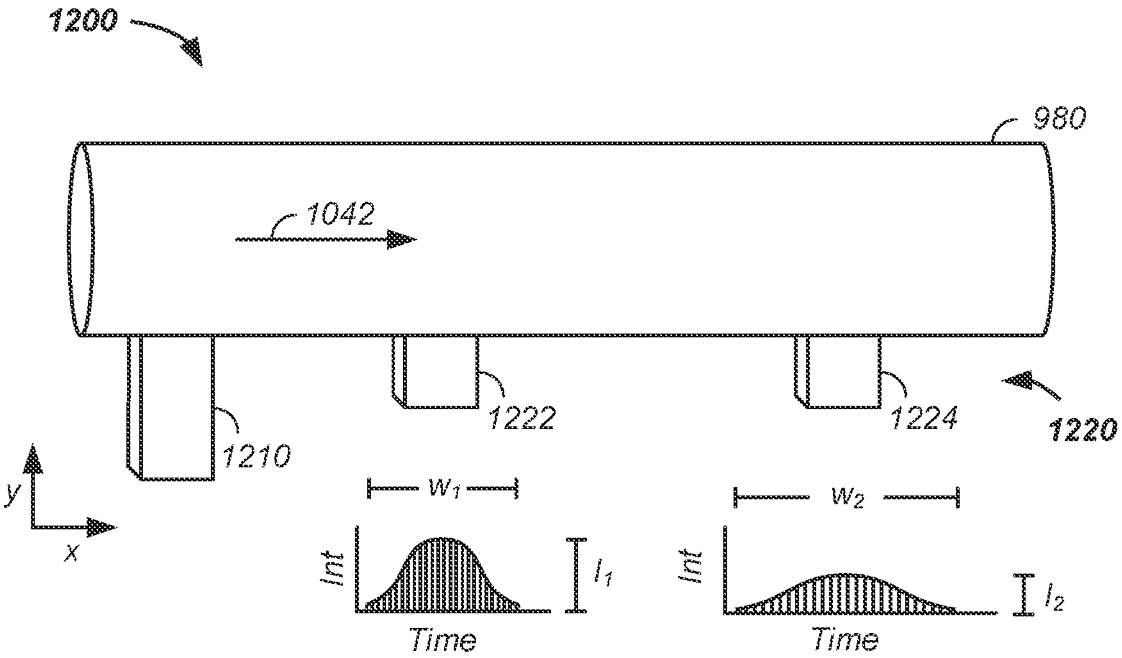
FIG. 12 illustrates reducing intensity and increasing width of a reference signal with distance.

Referring now to FIG. 12, longitudinal propagation 1200 of the force wave 1040 along a length of the pipe 980 is illustrated. Here, the ultrasonic transducer 900 is illustrated with a pulse generation section 1210 and a plurality of pulse detection sections 1220. The pulse generation section 1210 is optionally an example of the ultrasonic transducer 900. The pulse detection sections 1220, which are also examples of at least the piezoelectric material of the ultrasonic transducer, convert the propagating force wave 1040 into an electrical signal, such as via use of the piezoelectric component illustrated in the ultrasonic transducer coupled to a detection system, such as in illustrated in the magnetostriction sensor 1000. As illustrated, the pulse generation section 1210 generates the ultrasonic pulse, which forms the force wave 1040. A second path 1042 of the force wave 1040 is illustrated along a longitudinal length of the pipe 980. Generally, a first detected signal at a first detector 1222, of the plurality of detection sections 1220, has a first width, $w_1$, and a first intensity, $I_1$, and a second detected signal at a second detector 1224, of the plurality of detection sections 1220, has a second width, $w_2$, and a second intensity, $I_2$, where successive detected signals of progressively further removed detectors yield response signals with progressively smaller intensities and progressively wider responses, such as greater than 0.1, 1, 2, or 5% differences from detector element to detector element. Again, the second path 1042 of the force wave 1040 with progressively less intense and wider signal responses are illustrated here to describe another base wave element of detected signals, where analysis of the detected signal yields information on the state of the pipe 980, such as cracks, corrosion, pits, and build-up. For clarity of presentation, successive reduction in intensity and progressively wider responses of the base force wave are not illustrated in subsequent examples, where additional behavior of the force wave 1040 is illustrated. However, it is noted that reflections off of walls, such as in Example I, and progressive changes in the base behavior of ultrasonic pulses, such as in this Example II, are present in each signal and are accounted for in an analysis algorithm, which optionally and preferably uses reference signals of pipe widths, types, and materials; levels of corrosion; levels of build-up; types of carried fluids, fill levels of transported fluid; and/or types, orientations, and extent (magnitude and/or width) of cracks.

Example III

Figure 13:
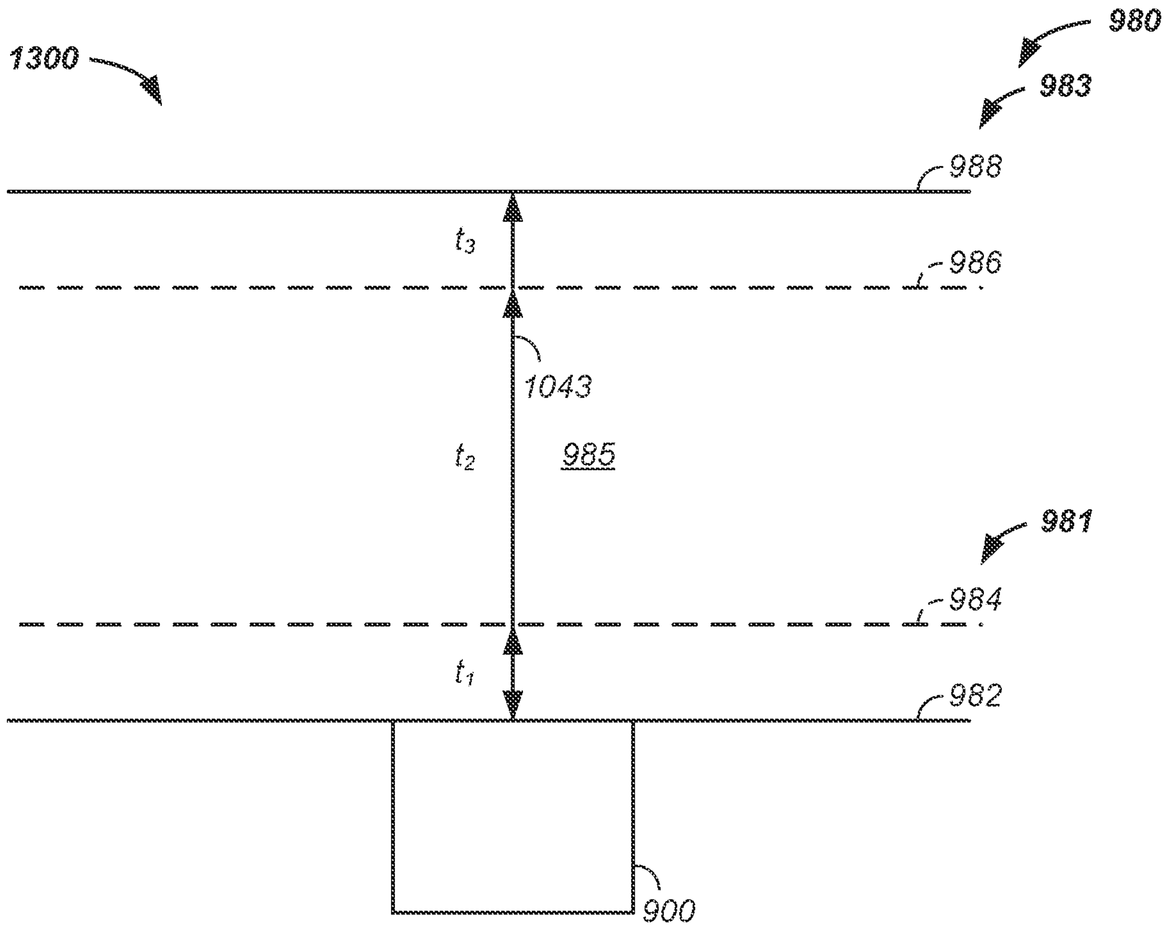
FIG. 13 illustrates a process of measuring a proximate and distal wall of a pipe.
Figure 14:
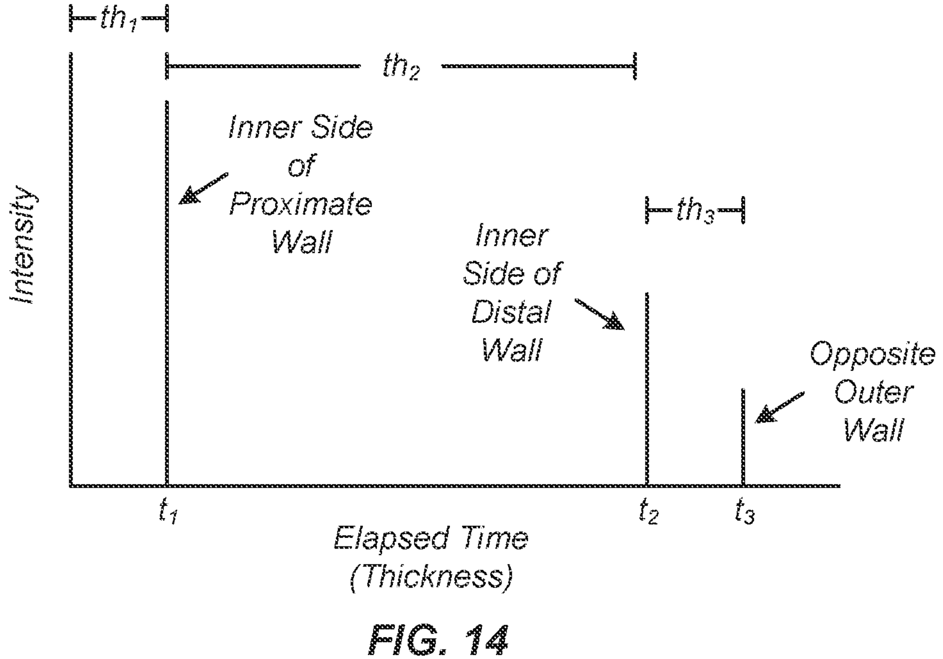
FIG. 14 illustrates signals from a proximate and distal wall of a pipe.

Referring now to FIG. 13, full radial pipe reflections 1300 are illustrated, which is an example of a third path 1043 of the force wave 1040. As illustrated, the force wave 1040 is generated by the ultrasonic transducer 900. The force wave 1040 travels through a proximate wall 981 of the pipe 980 at a first time, $t_1$, then through the fluid 985 in the pipe 980 at a second time, $t_2$, and then through a distal wall 983 of the pipe 980, such as through a second inner surface 986 and off a second outer surface 988 at a third time, $t_3$. As illustrated, signals from the third path 1043 of the force wave 1040 are detected using the piezoelectric element 920 of the ultrasonic transducer 900, where a change in shape of the piezoelectric element 920 induced by the force wave 1040 generates a current, which is converted to a voltage and amplified, such as with the use of the detection system 1080. Referring now to FIG. 14, the third path 1043 yields information on a first thickness, $th_1$, of the proximate wall 981 of the pipe 980; contents of the pipe in a second thickness, $th_2$, of the pipe 980; and a third thickness, $th_3$, of the distal wall 983, where deviations from a newly installed pipe yield information on corrosion of the pipe walls and/or build up of material on the pipe walls, as further described infra. Again, for clarity of presentation, successive reflections off of the proximate wall 981 and distal wall 983 of the pipe 980 are not illustrated in subsequent examples, where additional behavior of the force wave 1040 is illustrated. However, it is noted that reflections off of walls, such as in Example I; progressive changes in the base behavior of ultrasonic pulses, such as in this Example II; and reflections off of the distal wall 983 are present in each signal and are accounted for in a model of the pipe 980, as further described infra.

Corrosion/Build-up

The three examples, provided supra, yield information on a baseline state of a pipe 980. The next few examples show additional paths of the force wave 1040 through build-ups and corrosion in the pipe. Combined with baseline pathways and baseline expected intensities and widths of successive signals, information on the build-ups and corrosion within the pipe is derived, as further described herein.

Example IV

Figure 15:
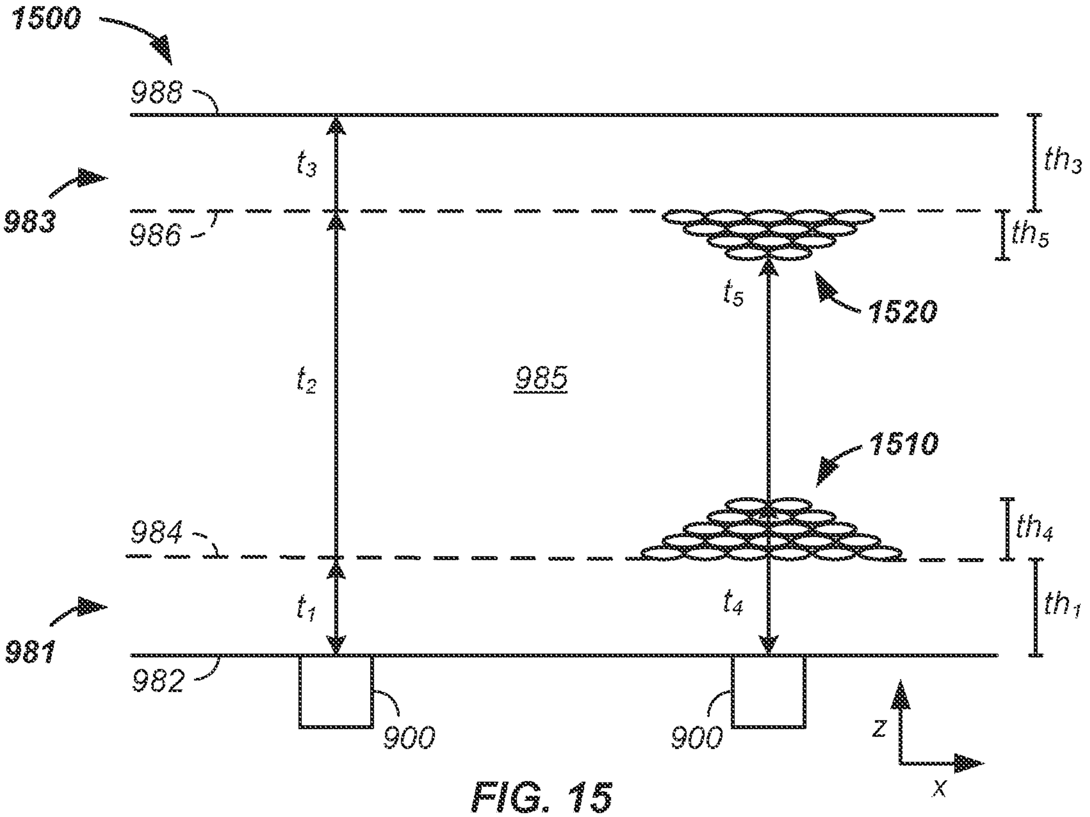
FIG. 15 illustrates a process of monitoring build-up in a pipe.
Figure 16:
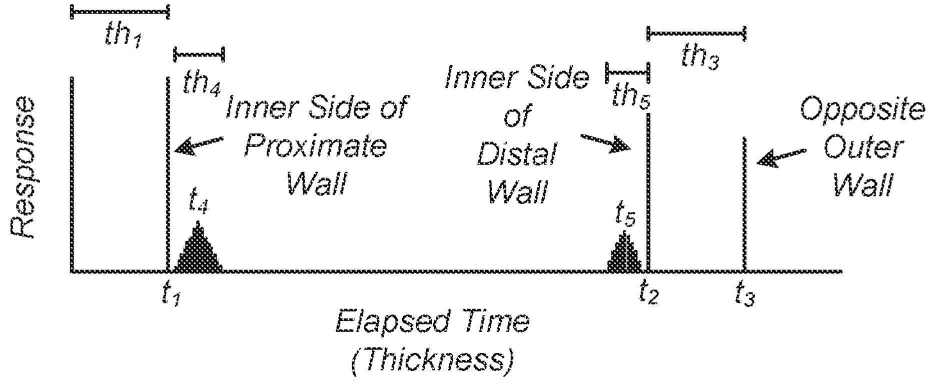
FIG. 16 illustrates signals from build-up in a pipe.

Referring now to FIG. 15, partial pipe clogging/build-up 1500 is illustrated. As illustrated in the left side of FIG. 15, initial times and corresponding expected signals of a transducer signal through a clean pipe are illustrated, such as in Example III. However, build-up of material in the fluid area 985 of the pipe 980 is illustrated on the right hand side of FIG. 15. Particularly, a first build-up 1510, such as on a bottom portion of the fluid area 985 results in a fourth signal at a fourth time. More particularly, a first signal representative of an intact proximate wall 981 is illustrated in FIG. 16 showing a non-corroded proximate wall 981 as the first thickness, $th_1$, at a first time, $t_1$, matches as reference signal of an intact proximate wall, such as in Example III. However, the first build-up 1510 results in new additional reflections of the force wave at a fourth time, $t_4$, which is a measure of a fourth thickness, $th_4$, of the first build-up. Similarly, a second build-up 1520 on the top of the inner fluid area 985 results in another set of reflections of the force wave 1040 at a fifth time, $t_5$, representative of a fifth thickness, $th_5$, of a build-up on the opposite wall of the pipe 980. Said again, the added signals at the fourth time and fifth time relative to a clean pipe set of signals, with reflections at the first, second, and third times, provides information on build-ups on different inner surfaces of the pipe 980 and the width of the fourth time signals and fifth time signals is indicative of the extent (depth) of the build-ups.

Example V

Figure 17:
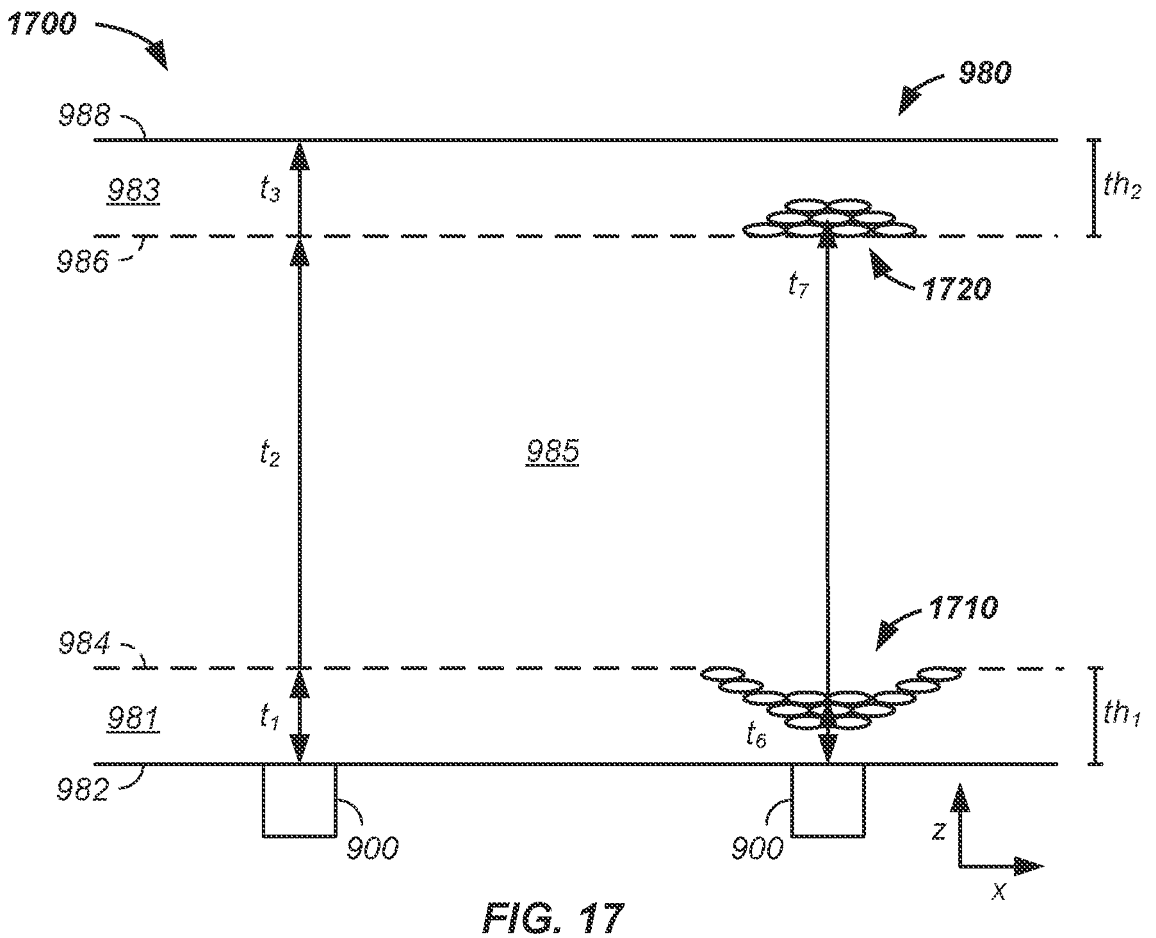
FIG. 17 illustrates a process of monitoring corrosion in a pipe.
Figure 18:
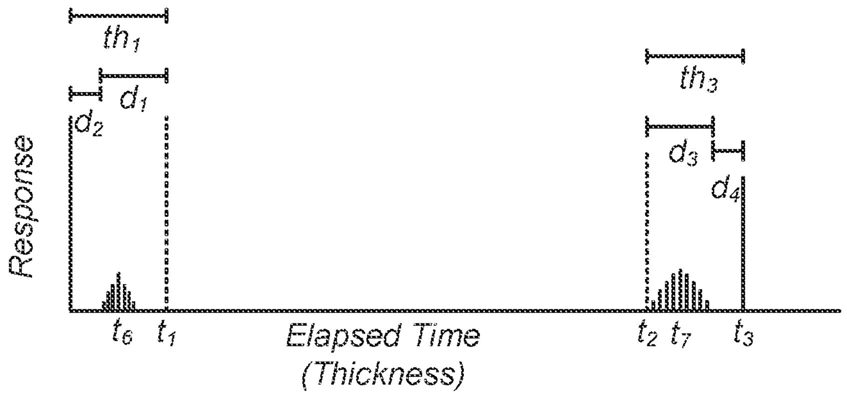
FIG. 18 illustrates signals from corrosion in a pipe.

Referring now to FIG. 17, partial pipe corrosion 1700 is illustrated. Similar to the previous example, a first, second, and third time, on the left of FIG. 17, represent ultrasonic pathways in an uncorroded pipe. On the right side of FIG. 17, first corrosion 1710 is illustrated on a proximate side of the pipe 980 relative to the ultrasonic transducer 900. At a sixth time, the force wave 1040 is at least partially reflected by the first corrosion 1710. Referring now to FIG. 18, the sixth time of a response, indicative of corrosion, versus the above described first time, indicative of a thickness of the proximate wall 981 reveals the thickness of the corrosion, $d_1$, and a thickness of the remaining intact wall, $d_2$, which add up to the first thickness, $th_1$, of the original proximate wall 981. Similarly, referring again to FIG. 17, second corrosion 1720 in the distal wall 983 yields a seventh time signal, $t_7$. Referring again to FIG. 18, the seventh time signal, $t_7$, yields a measure of a distal wall corrosion thickness, $d_3$, and a remaining distal wall thickness, $d_4$, which add up to an original thickness, $th_3$, of the distal wall 983.

Example VI

Figure 19A:
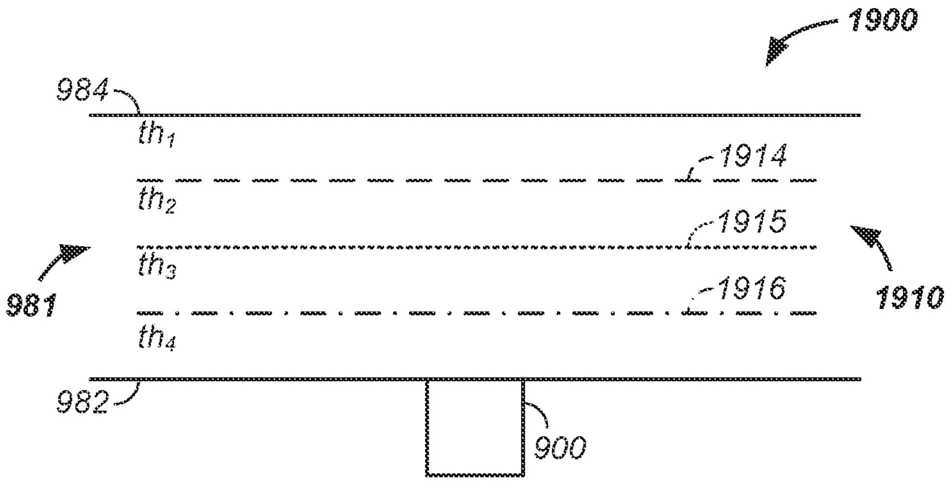
FIG. 19A illustrates calibration.
Figure 19B:
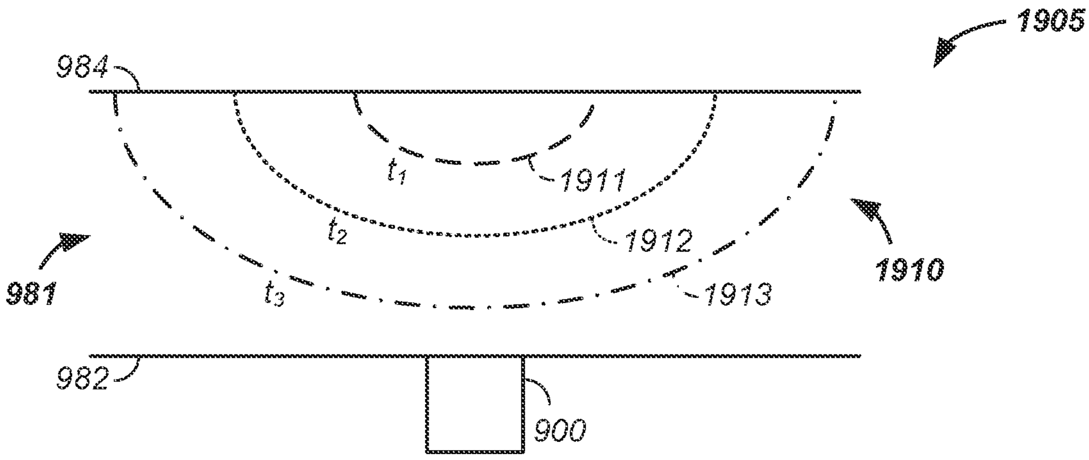
FIG. 19B illustrates corrosion.
Figure 19C:
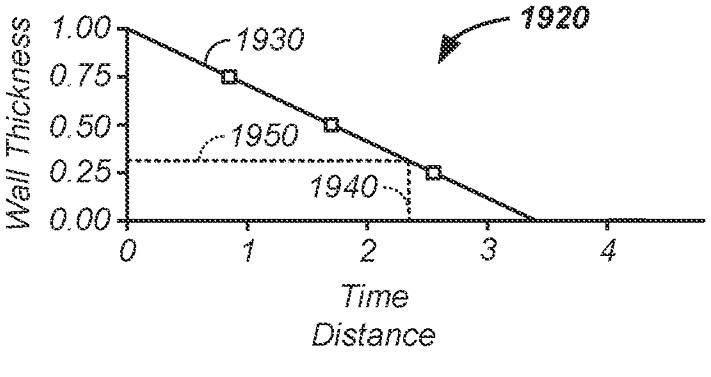
FIG. 19C illustrates quality control of pipe thickness.

Referring now to FIGS. 19(A-C) measuring corrosion as a function of time is illustrated. Referring now to FIG. 19A, a controlled thickness pipe 1900 is illustrated with an initial thickness, $th_1$; a first reduced thickness 1914, $th_2$, such as after machining; a second reduced thickness 1915, $th_3$; and a third reduced thickness 1916, $th_4$. Essentially, the ultrasonic transducer 900 makes measurements on each pipe wall thickness and a calibration plot is generated, which is illustrated in FIG. 19C, specifically with the open squares. Referring now to FIG. 19B, corrosion in the proximate pipe wall is illustrated at a first time, $t_1$; second time, $t_2$; and third time, $t_3$, as measured by the ultrasonic transducer 900. In practice, when the ultrasonic transducer 900 measures an indicator time 1940 corresponding to a threshold wall thickness 1950, maintenance on the pipe is triggered, such as repairing the corrosion or more likely replacing the pipe. Essentially, the calibrated ultrasonic transducer signal indicates, before pipe failure, when and where to perform maintenance on one or more pipes.

Example VII

Figure 20:
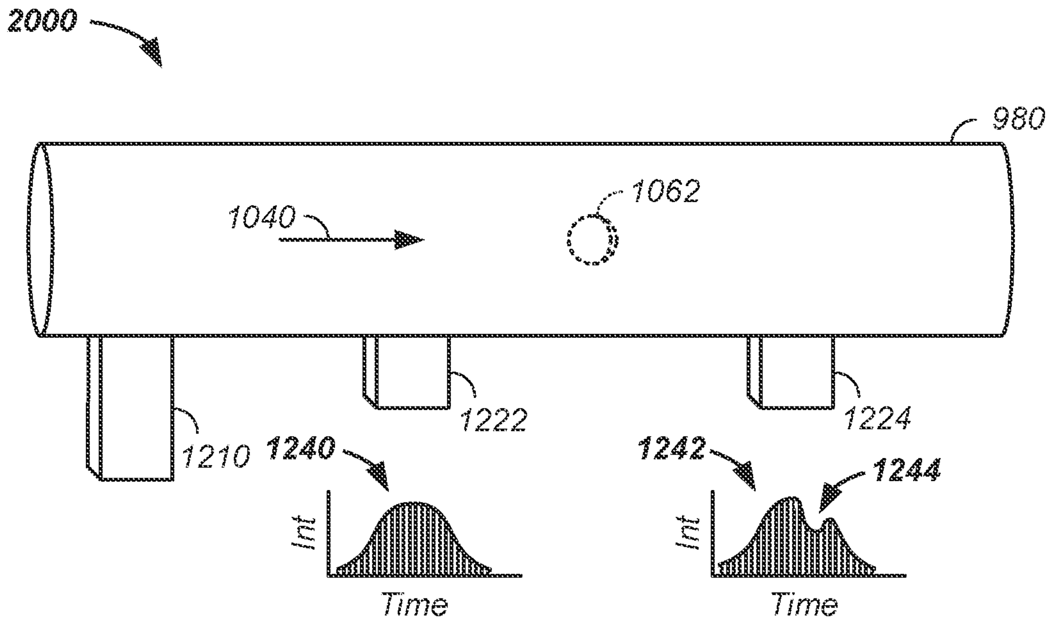
FIG. 20 illustrates monitoring an absorbance of a signal due to an imperfection.

Referring now to FIG. 20, fault detection 2000 in the pipe 980 is illustrated. The ultrasonic transducer 900 is optionally and preferably used to isolate a region of a fault, such as a crack, pit, corrosion, and/or build-up. Referring again to FIG. 13 the pulse generation section 1210 generates the ultrasonic pulse, which forms the force wave 1040. As described, supra, a calibration is performed and the intensity and width decrease and widen, respectively, in a known manner in a new pipe, such as in a fresh pipe signal 1240. In the field, the pipe 980 develops imperfections, such as a crack 1060 or imperfection 1062. Referring again to FIG. 20, as the force wave 1040 passes through the imperfection 1062, representative here of any crack, build-up, or corrosion, the force wave 1040 is altered to form a used pipe signal 1242, such as where particular alterations, patterns, or absorbances 1244 of the force wave are observed. Here, since the absorbances 1244 are observed after the first detector 1222 and prior to the second detector 1224, maintenance is alerted to a fault in the pipe 980 between the first detector 1222 and the second detector 1224. Generally, any number of detectors are used, such as greater than 1, 2, 4, 10, 25, 50, 100, or 1000 along the pipeline. Further, with a library of reference absorbance types, the absorbance 1244 is indicative of the type of fault, as further described infra.

Example VIII

Figure 21:
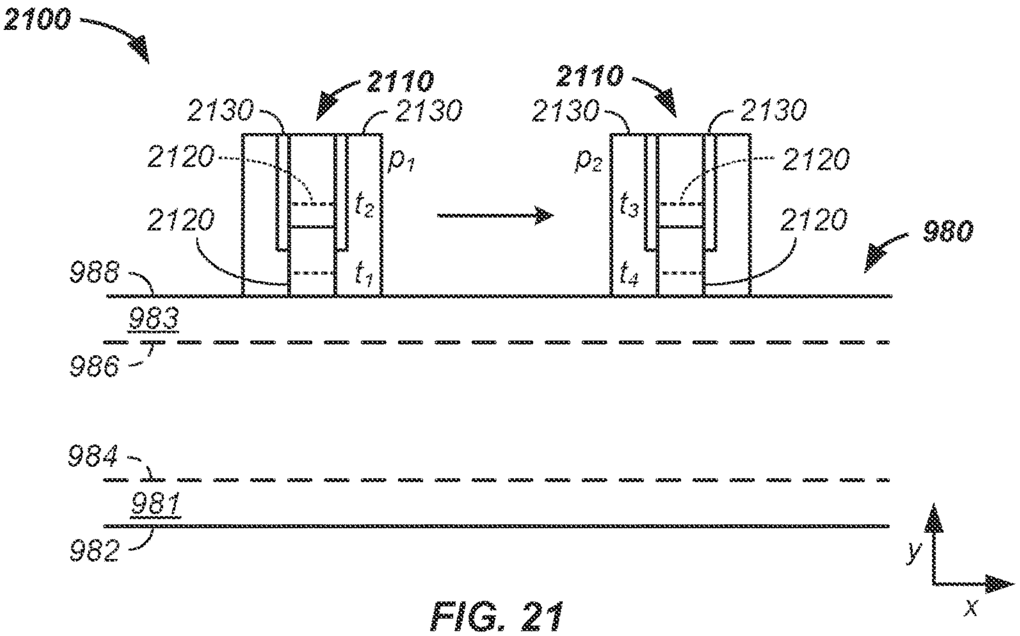
FIG. 21 illustrates a translatable ultrasonic sensor.
Figure 22:
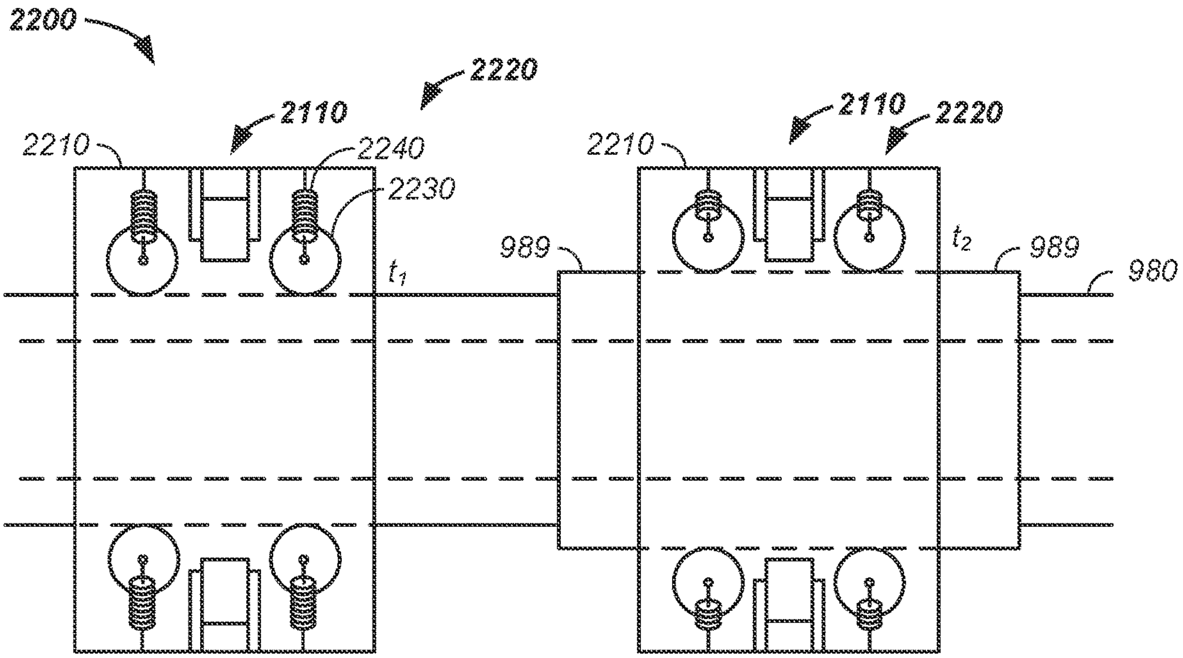
FIG. 22 illustrates an ultrasonic sensor moving over a joint.

Referring now to FIG. 21, a moveable ultrasonic transducer 2100 is illustrated. Essentially, the moveable ultrasonic transducer 2120, a form of the ultrasonic transducer 900, is optionally used at a first position, $p_1$, on the pipe 980 and is then translated with a translator 2110, such as along a length of the pipe 980, and is subsequently used again, the process repeating any number of times. In one particular embodiment presented for clarity and presentation and without loss of generality, the ultrasonic transducer is positioned on the pipe at a first time, $t_1$; is subsequently translated radially away from the pipe 980 at a second time, $t_2$; is translated in a carrier 2130 along at least a section of the pipe 980 to a second position, $p_2$; where the moveable ultrasonic transducer is lowered after a third time, $t_3$, to a second contact position with the pipe at a fourth time, $t_4$. Referring now to FIG. 22, a carrier 2200 is illustrated. Generally, any form of carrier 2210 is used to reposition ultrasonic transducer, such as along an x-axis of the pipe 980. Here, a tire 2230 or roller is used to climb up and over a joint 989 in the pipe 980, such as a joint joining pipeline sections. Any mechanism is optionally used to cross the joint 989. Here, a spring 2240 is illustrated to perform the task. Generally, the system allows the carrier to mechanically move the ultrasonic transducer 900 along the pipeline from section to section.

Example IX

Figure 23:
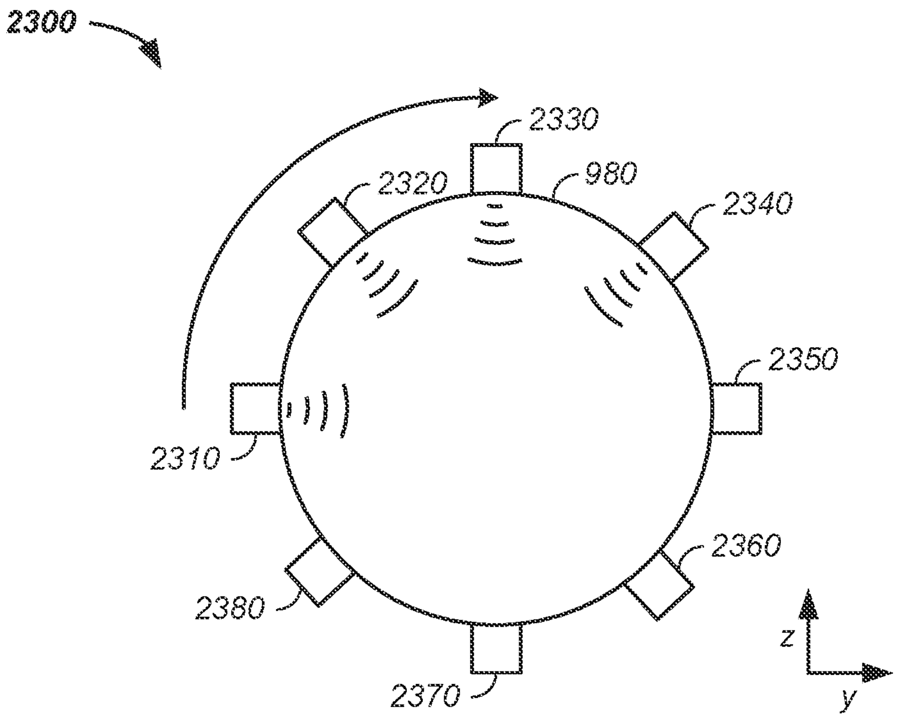
FIG. 23 illustrates rotation of an ultrasonic circumferentially around a pipe.

Referring now to FIG. 23, the ultrasonic transducer 900 is optionally rotated around the pipe 980 to take readings from different radial positions, which yields more precise information on state of the pipe 980. As illustrated, the ultrasonic transducer 900 is rotated into eight positions: a first position 2310, a second position 2320, a third position 2330, a fourth position 2340, a fifth position 2350, a sixth position 2360, a seventh position 2370, and an eighth position 2380 of any number of possible rotation around the pip 980 positions. As a reading from the ultrasonic transducer 900 also generates information from the distal wall 983, optionally and preferably the ultrasonic transducer 900 is rotated through an angle of 180 degrees, or less, around a central point in the pipe 980 to achieve a reading of all sections of a pipe circumferentially surrounding the pipe center.

Example X

Figure 24A:
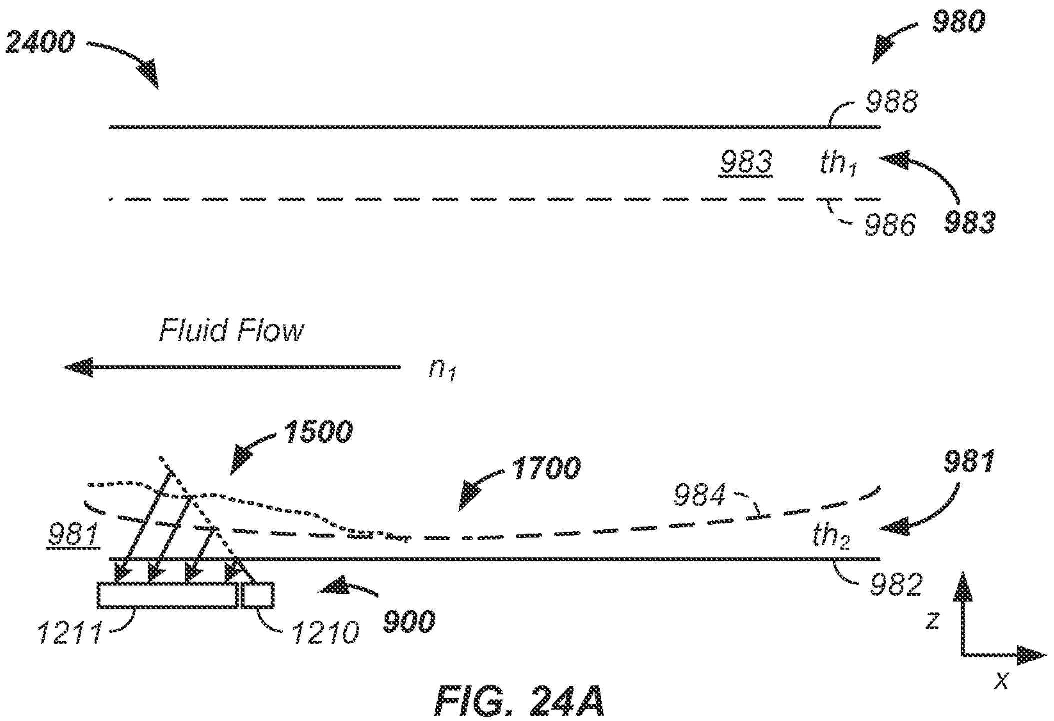
FIGS. 24A and FIG. 24B illustrate a sensor array and an array of sensors on a pipe, respectively.
Figure 24B:
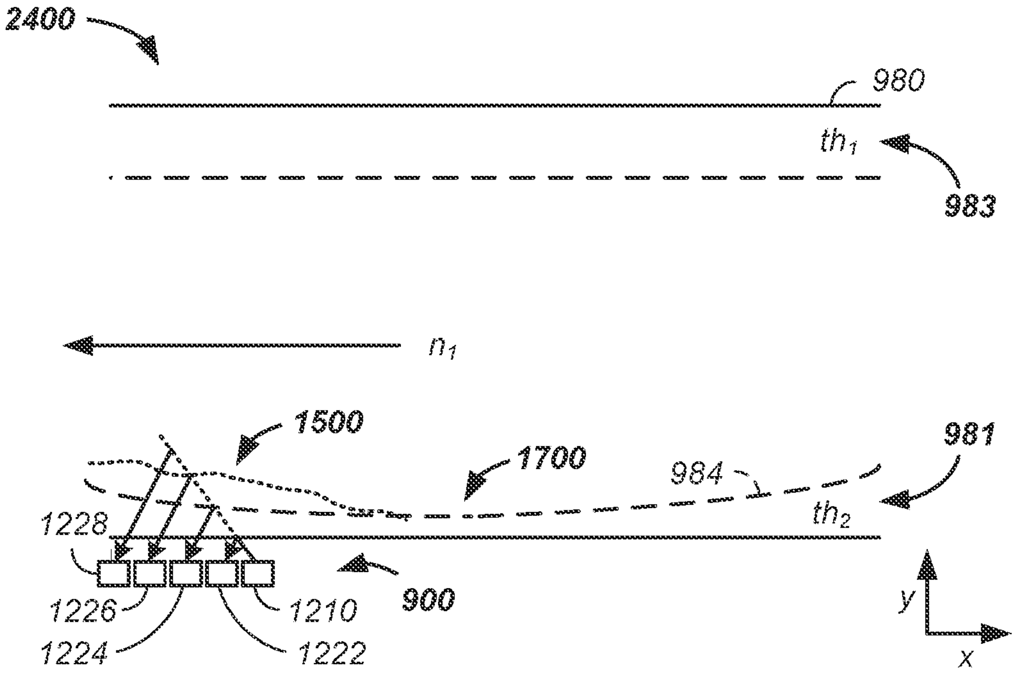

Referring now to FIG. 24A and FIG. 24B, transducer detector arrays are illustrated, which allow further precision in location of a crack, deformation, build-up, and/or corrosion in the pipe 980. As illustrated, the transducer 900 is illustrated with a pulse generation section 1210 and an array of detectors 1211 in FIG. 24A or similarly with a set of detectors in FIG. 24B, such as a first force/deformation detector 1222, a second force detector 1224, a third force detector 1226, and a fourth force detector 1228 of n force detectors, where n is a position integer greater than 1, 2, 5, 10, 50, or 100. The array of detectors allows for a localized extent of the build-up 1500 and/or corrosion 1700 to be measured, such as within less than 1, 2, 4, 6, 12, 24, 36, 72, or 144 inches. Optionally, the pulse generation section 1210 is an array of sources at different spatial positions and/or an array of sources where a common source and/or differing sources use differing wavelengths, energies, frequencies, and/or powers, such as at frequencies exceeding and/or less than 20, 30, 40, 50, 100, 500, 1000, 5000, 10,000, 100,000, or 1,000,000 kHz; at wavelengths less than 1.9 cm; and/or at imaging frequencies.

Still referring to FIG. 24A, the pipeline state determination/state determination system is optionally used to measure fluid flow 930, the fluid in the pipe, an index of refraction, $n_1$, of the fluid, corrosion of the wall of the pipe, such as diminishing from a first thickness, $th_1$, to a second thickness, $th_2$, and/or build-up of material in the pipe 980, such as measure with a third thickness, $th_3$. Similarly, a known density and/or index of refraction of the fluid is optionally used in a calculation and/or an imaging of the wall thickness.

Example XI

Figure 25A:
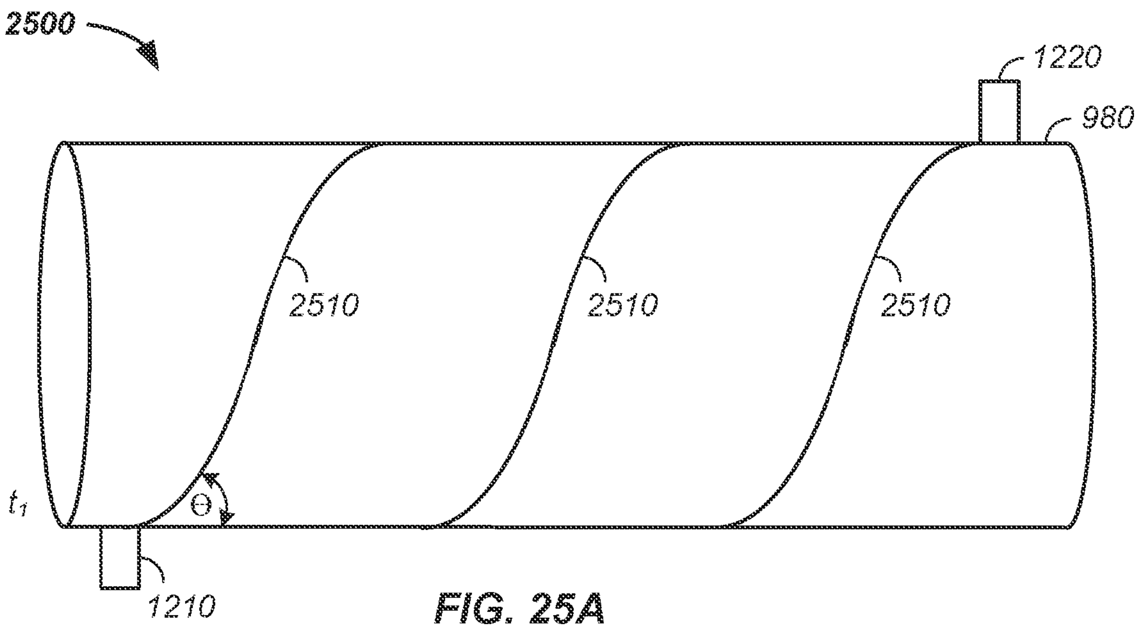
FIG. 25A illustrates a helical path of an ultrasonic measurement and FIG. 25B illustrates intersecting paths of ultrasonic waves launched with a multitude of launch angles.
Figure 25B:
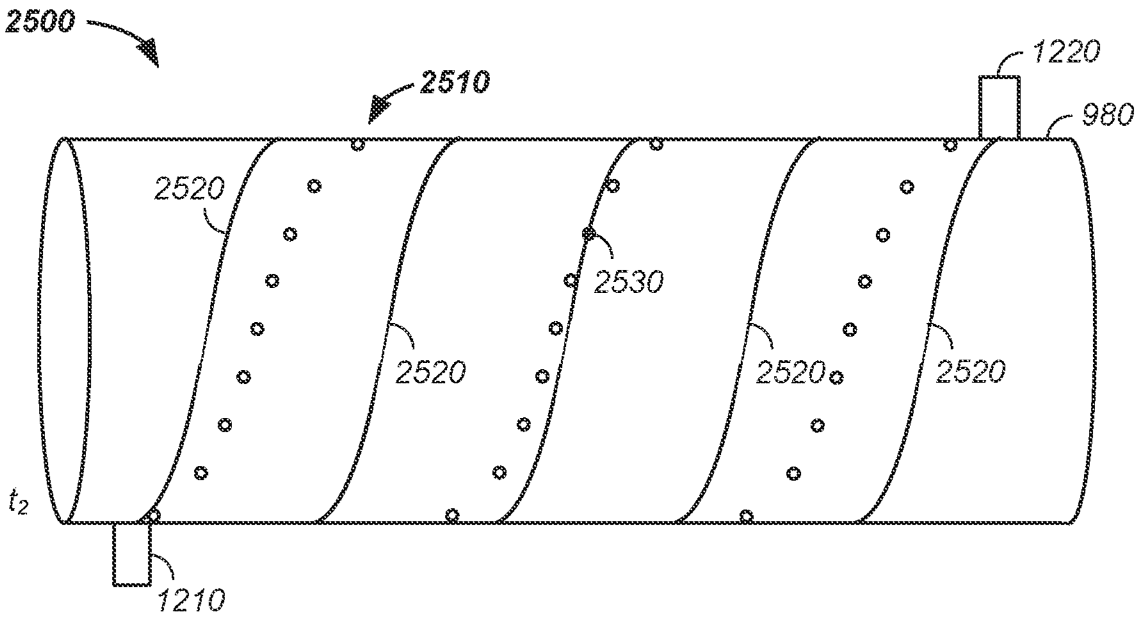

In previous examples, the ultrasonic transducer 900 is demonstrated to measure across the pipe 980, along the pipe 980, and/or around the pipe 980. Referring now to FIG. 25A and FIG. 25B, a guided wave system 2500 is illustrated where differing areas of the pipe 980 are dynamically probed with the ultrasonic transducer 900. Referring still to FIG. 25A, at a first time, $t_1$, a first guided wave is generated by the pulse generation section 1210, of the ultrasonic transducer 900, at a first angle, Θ, between 0 and 90 degrees, relative to a length of the pipe 980, which sends the force wave 1040 along a first centralized helical path 2510 down the pipe to at least one detection section 1220 of the ultrasonic transducer 900. Thus, the first helical path 2510 that has a 95% probability width of less than 1, 2, 5, 10, 20, 50, or 100 cm, with a first number of rotations around the pipe 980 per unit length, probes a first set of areas/volumes of the pipe 980. Referring again to FIG. 25B, at a second time, $t_2$, a second guided wave, with angles and widths in a range of the first guided wave, is generated by the pulse generation section 1210, of the ultrasonic transducer 900, at a second angle at least 1, 2, or 5% different than the first angle, which sends the force wave 1040 along a second centralized helical path 2510 down the pipe to at least one detection section 1220 of the ultrasonic transducer 900 with a second number of rotations around the pipe 980 per unit length. Optionally and preferably, the second number of rotations of the second helical path is at least 10, 20, 50, or 100% that of the first number of rotations of the first helical path per unit length, such as a 1, 2, 3, or more meters. As illustrated, the first helical path 2510 and the second helical path probe primarily different areas/volumes of the pipe; however, there are some overlaps, such as at a first overlap point 2530. Thus, if an imperfection is measured, such as with a common absorbance signal, with the first helical path 2510 and the second helical path 2520, a precise imperfection location is identified. In practice, many launch angles, such as greater than 2, 4, 6, 8, or 10, of the force wave 1040 are used to cover greater than 50, 60, 70, 80, 90, 95, or 98% of the pipe 980 area/volume and/or to yield overlap areas of the helical paths covering greater than 50, 60, 70, 80, 90, 95, or 98% of the pipe 980 area/volume. The inventors note that the helical probing of the pipe 980 allows for analysis of an opposite side of the pipe relative a location of the ultrasonic transducer 900 even when the pipe 980 is only partially filled or is empty, which is not possible with a traditional use of an ultrasonic transducer as the force wave 1040 will not effectively penetrate through air in the pipe. Optionally and preferably, the ultrasonic transducer 900 generates pulses at a rate in a range of 40 KHz to 40 MHz or 400 KHz to 25 MHz.

Model

Figure 26:
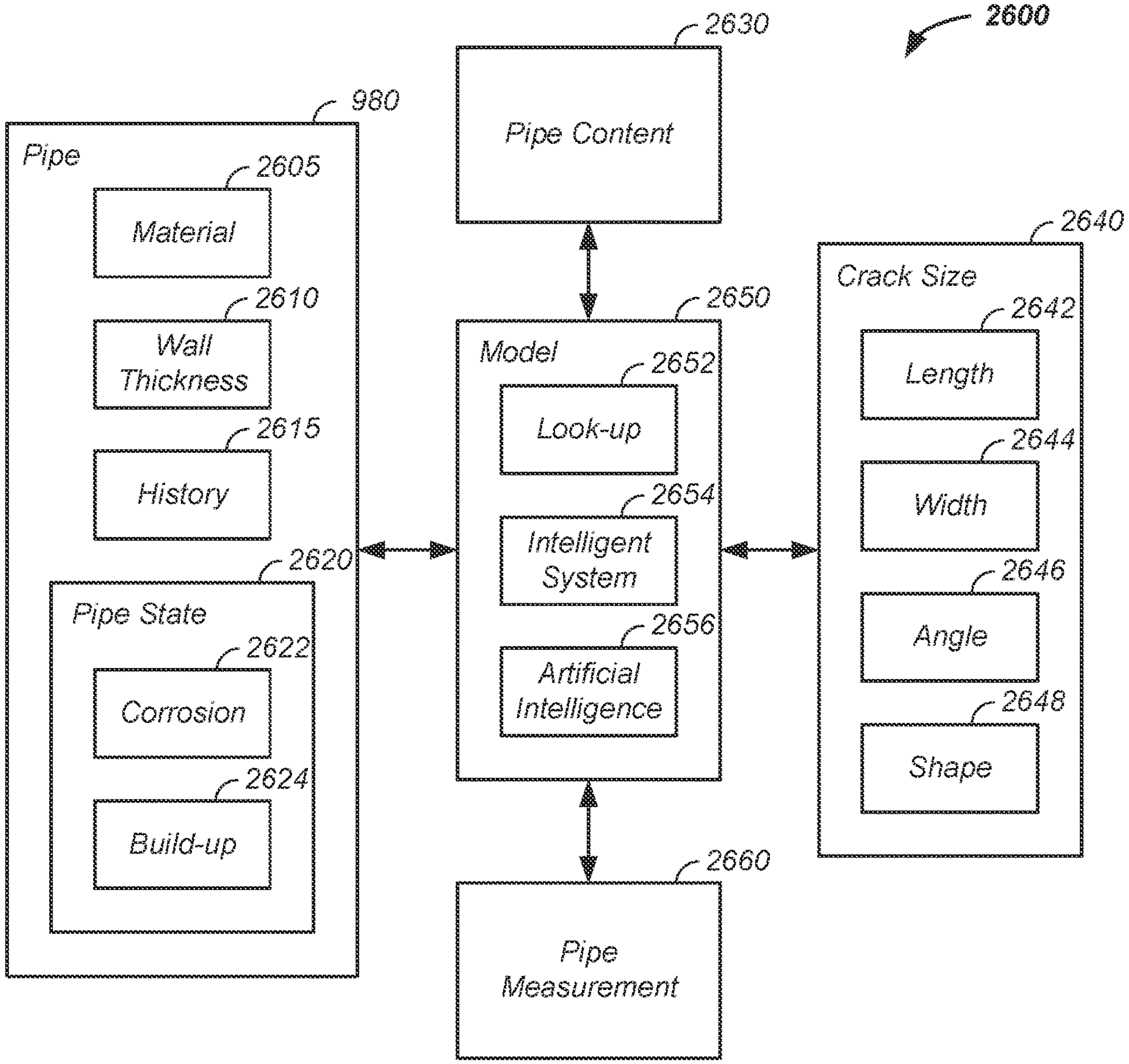
FIG. 26 illustrates development and/or use of a pipeline monitoring model.

Referring now to FIG. 26, the main controller 110 is further described. For instance, the main controller 110 optionally and preferably uses a model system 2600. The model system 2600 calibrates and/or uses a model 2650 of how features affect a force wave 1040 generated with the ultrasonic transducer 900 or similar pipe sensor. Several examples of training and/or use of the model 2650 are presented for clarity of presentation and without loss of generality.

Example I

Still referring to FIG. 26, calibration signals of the force wave 1040 propagating through the pipe 980 are optionally and preferably generated that represent a range of real-world states of the pipe 980. For instance, force waves 1040 are generated and tested for pipes 980 constructed with different materials 2605 to build a calibration set and/or a set of reference signals. Similarly, force waves 1040 are generated and tested for pipes having different wall thicknesses 2610 and/or histories 2615, such as at varying ages of similar use. Further, force waves 1040 are generated and tested in pipes having known states 2620, such as varying states of build-up 1500 and/or corrosion 1700. Subsequently, when a pipe 980 is tested, such as in the field, a pipe measurement 2660 is compared with the calibration set and/or reference signals and a condition of the pipe is estimated, such as a current pipe state 2620, such as a measured amount of build-up 1500 and/or corrosion 1700.

Example II

Still referring to FIG. 26, in this second example, calibration signals of the force wave 1040 propagating through the pipe 980 are again optionally and preferably generated that represent a range of real-world states of the pipe 980; in this case covering pipe content 2630. Content of a pipe 2630 affects the force waves 1040 either via direct attenuation, via an attenuated total reflectance, by density, and/or index of refraction. Hence, again, reference signals of how differing pipe contents 2630 affect the force waves 1040 are generated in a reference and/or calibration data set and, in a manner similar to the first example, subsequent pipe measurements 2660 are made and corresponding pipe content 2630 predictions are made. For instance, amounts of two component mixtures are made, such as an amount of water in an oil line and/or a first amount of a first grade/type of oil versus and a second amount of a second grade/type of oil currently in the pipe 980, such as at a given measured position and/or length of the pipe 980. Fill level of the pipe 980 with any fluid is optionally similarly calibrated and used as a prediction measure.

Example III

Still referring to FIG. 26, in this third example, calibration signals of the force wave 1040 propagating through the pipe 980 are again optionally and preferably generated that represent a range of real-world states of the pipe 980; in this case covering one or more pipe imperfections, such as pitting and/or crack size 2640. Generally, reference pipes are constructed and/or found and tested with known lengths 2642 of a crack, known widths 2644 of a crack, known angles 2646 of the crack relative to an incident path of the force wave, and/or known geometric shapes 2648 of cracks. Again, when subsequent pipe measurements 2660 are made, the model 2650 generates an estimated pipe state 2620, such as an estimated length, width, angle, and/or geometry of a crack along with an estimated position.

Example IV

Still referring to FIG. 26, generally the model 2650 is built with one or more reference signals, such as any parameter described herein such as multiple reflectances from a surface, degradation of intensity with length, increased response width as function of propagation distance, from any set of angles, from an array of detectors, and/or from any parameter illustrated in FIG. 26, such as: the pipe 980, pipe content 2630, and crack size 2640. Subsequently, the model 2650 is used to estimate state of the pipe 980 and/or a pipe content 2630 using the model 2650 operating on a pipe measurement 2660. The model 2650 is optionally any one of or a blend of a calibration, a look-up table 2652, an intelligent system 2654, and/or an artificial intelligence system 2656.

Optionally, any of the sensors described herein are used to gather information at a first time and one or more subsequent times, such as for use in a time differential measurement.

Optionally, one or more of the ultrasonic sources described herein are configured as ultrasonic cleaners.

Optionally, one or more of any of the sensors describe herein are X-ray sensors.

Optionally, data, such as weather data, along with location of source of the data is provided, optionally for a fee, to a weather service.

Referring again to FIG. 1, the main controller 110 is further described. The main controller 110, having received localized state of the weather and/or state of the pipeline grid from the sensor arrays 200 is optionally and preferably used to provide summary information for decision making about the state of the pipeline grid at any monitored location and/or between monitored locations by differential signals. Several non-limiting examples follow.

Example I

A monitoring device is mounted to a pipeline that monitors the motion of that conductor, such as from a seismic shift that may dislodge joints or the pipeline or break the pipeline. If and when that motion is large enough either in amplitude or frequency to cause concern based on a predetermined metric, an action will be taken. For instance, the action is optionally to replace a section of the pipeline prior to seismic shifts needed to break the pipeline, in advance of a fault, depending on the severity of the data and thus provides capability to react proactively before an unintended fault or catastrophic failure.

Example II

The monitor device package optionally includes a global positioning sensor.

Example III

The monitor device package optionally and preferably includes a power source. This power source may be one or more of the following: battery, solar powered, wind powered, parasitically powered (i.e. couples energy from a local power conductor. Power sources optionally work together, such as a solar array and a battery for low/no sun times, a parasitic power source, and a battery to be used should the power be shut off intentionally or by accident or damage.

Example IV

This monitor device package will possibly communicate with a fixed or relatively fixed object, such as a station on a support tower. This fixed object may be close by (possibly WiFi range ~100 m) or may be fairly far away (LoRa range >10 km). The monitor device may be able to communicate at multiple distances via one or more communication method.

Example V

The monitor device package optionally communicates with additional devices having different metrology. For example, a monitor device package on a power conductor might communicate with a weather station mounted on an adjacent or nearby tower. The weather station might include any or all of the following: a temperature sensor(s), an anemometer, a wind direction indicator, a barometer, a hygrometer, a precipitation measurement device. Any, all or a combination of these measurements might be used as a trigger for the monitor device package to record or transmit data. As an example, if the wind speed were measured at over 10, 20, 30, 40, 50, 60, 80, or 100 mph the monitor device package is optionally triggered to record data and send it to a data collection and storage device.

Example VI

The monitor device package optionally receives data from an external source, either directly or indirectly through a fixed mounted device or another monitor device package. For example, the monitor device package might receive information from a local meteorological station, or a seismic station, or based on some information available on the world wide web. These received data may be used to trigger the monitor device package to record and or transmit data, or to do something else like reboot, start a measurement, activate a different piece of metrology, turn on a camera, reposition a camera, etc.

Example VII

The spatial distribution of the sensors in the sensor array 200 is optionally a function of local population density, historical wind speeds, population density, and/or proximity of high value systems.

Still yet another embodiment includes any combination and/or permutation of any of the elements described herein.

Herein, any number, such as 1, 2, 3, 4, 5, is optionally more than the number, less than the number, or within 1, 2, 5, 10, 20, or 50 percent of the number.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention.

Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. A method for monitoring a pipeline, comprising the steps of:

providing a pipeline network, said pipeline network comprising a first pipeline, said first pipeline comprising at least a first pipe and a second pipe directly contacted by and coupled by a first coupler and a second coupler directly contacting and coupling said second pipe to a third pipe;

monitoring said first pipeline with a first sensor array comprising: a first ultrasonic sensor mechanically coupled to said first pipe, a second ultrasonic sensor mechanically coupled to said second pipe, and a third ultrasonic sensor mechanically coupled to said third pipe;

gathering first signals to a first sub-communication system from said first ultrasonic sensor, said second ultrasonic sensor, and said third ultrasonic sensor; and processing data from said first ultrasonic sensor, said second ultrasonic sensor, and said third ultrasonic sensor with a main controller comprising a model, said model comprising an artificial intelligence system trained with first reference force wave signals collected from reference pipes with known crack parameters.

2. The method of claim 1, further comprising the steps of:

measuring said first pipe with a first force wave launched at a first angle relative to a length of said first pipe from an ultrasonic transducer element of said first ultrasonic sensor; and measuring said first pipe with a second force wave launched at a second angle relative to said length of said first pipe from said ultrasonic transducer element of said first ultrasonic sensor, said first angle at least ten degrees larger than said second angle.

3. The method of claim 2, further comprising the steps of:

detecting a first response of said first force wave with a detector element, said first force wave comprising a first mean helical path along and around said first pipe with a first number of helical turns per a unit length of said first pipe;

detecting a second response of said second force wave with said detector element, said second force wave comprising a second mean helical path along and around said first pipe with a second number of helical turns per said unit length of said first pipe, said second number of helical turns per said unit length differing from said first number of helical turns per said unit length by at least ten percent.

4. The method of claim 3, further comprising the steps of:

detecting a first imperfection in a first path in said first pipe with said first response; and detecting a second imperfection in a second path in said first pipe with said second response, said second imperfection not overlapping said first imperfection.

5. The method of claim 3, further comprising the steps of:

detecting a first imperfection in said first pipe with said first response; and detecting said first imperfection with said second response.

6. The method of claim 5, further comprising the step of:

pulsing a piezoelectric element of said ultrasonic transducer element with a frequency in a range of 40 KHz to 25 MHz.

7. The method of claim 6, further comprising the step of:

relaying collected signals: from said first ultrasonic sensor to said second ultrasonic sensor, from said second ultrasonic sensor to said first ultrasonic sensor, and from said first ultrasonic sensor to said first sub-communication system.

8. The method of claim 6, further comprising the step of:

monitoring said first coupler with a third force wave launched from a fourth ultrasonic sensor positioned on a surface of said first coupler.

9. The method of claim 6, said step of processing further comprising the step of:

training said artificial intelligence system with second reference force wave signals collected from reference pipes with known build-ups and known corrosion.

10. The method of claim 1, further comprising the step of: rotating said first ultrasonic sensor around at least twenty degrees of rotation about a section of said first pipe.

11. The method of claim 10, further comprising the steps of:

detecting a first imperfection in said first pipe with first data collected after said step of translating; and detecting said first imperfection after said step of rotating.

12. The method of claim 3, further comprising the step of:

monitoring said second pipeline with a second sensor array comprising: a fourth ultrasonic sensor mechanically coupled to a fourth pipe, a fifth ultrasonic sensor mechanically coupled to a fifth pipe, and a sixth ultrasonic sensor mechanically coupled to a sixth pipe;

gathering second signals to a second sub-communication system from said fourth ultrasonic sensor, said fifth ultrasonic sensor, and said sixth ultrasonic sensor; and relaying to said main controller, at a base station at least one hundred feet from said first pipeline, first information related to said first signals from said first sub-communication system and second information related to said second signals from said second sub-communication system.

13. The method of claim 12, further comprising the steps of:

detecting a first imperfection in said first pipe with said first response; and detecting said first imperfection with said second response.

14. The method of claim 12, further comprising the steps of:

sending data between said first sub-communication system on said first pipeline and said second sub-communication system on said second pipeline; and relaying, after said step of sending, said data to said main controller.

* * * * *